United States Patent [19]

Readal et al.

[11] 4,109,142
[45] Aug. 22, 1978

[54] PROCESS DATA TRACKING SYSTEM

[75] Inventors: Gerald J. Readal, Pittsburgh; John R. Tiskus; William J. Tomcanin, both of Monroeville, all of Pa.

[73] Assignee: United States Steel Corporation, Pittsburgh, Pa.

[21] Appl. No.: 492,960

[22] Filed: Jul. 29, 1974

[51] Int. Cl.² ............................................. B21C 51/00
[52] U.S. Cl. ......................... 235/92 DN; 235/92 DP; 235/92 R; 235/92 PD
[58] Field of Search ....... 235/92 DN, 92 PD, 92 MP, 235/92 DP, 151.1, 103.5; 33/133, 142; 214/11 C

[56] References Cited

U.S. PATENT DOCUMENTS

| | | | |
|---|---|---|---|
| 3,584,200 | 6/1971 | Layman | 235/92 DN |
| 3,648,029 | 3/1972 | Ungnadner | 235/92 DN |
| 3,838,254 | 9/1974 | Halter | 235/92 DN |

*Primary Examiner*—Joseph M. Thesz
*Attorney, Agent, or Firm*—Arthur J. Greif

[57] ABSTRACT

A tracking system provides a means for tracking two types of data, event data and processing data. Event data include information such as the location of welds and other strip discontinuities in a continuous strip processing line. Event data are tracked in a series of counters, such that the contents of each counter at any given time reflect the location of an event with respect to a specific reference point in the line. At various times during the tracking of event data, the tracking counters are calibrated with reference to a known strip length increment to correct for cumulative tracking errors. Processing data are tracked through various stations on the line; the processing data are stored in a bank of memory cells and moved from cell to cell as the strip moves from station to station so that the contents of each cell in the bank at any given time reflects past processing conditions for an incremental strip length located in the line at a point corresponding to the location of that data in the memory bank.

8 Claims, 16 Drawing Figures

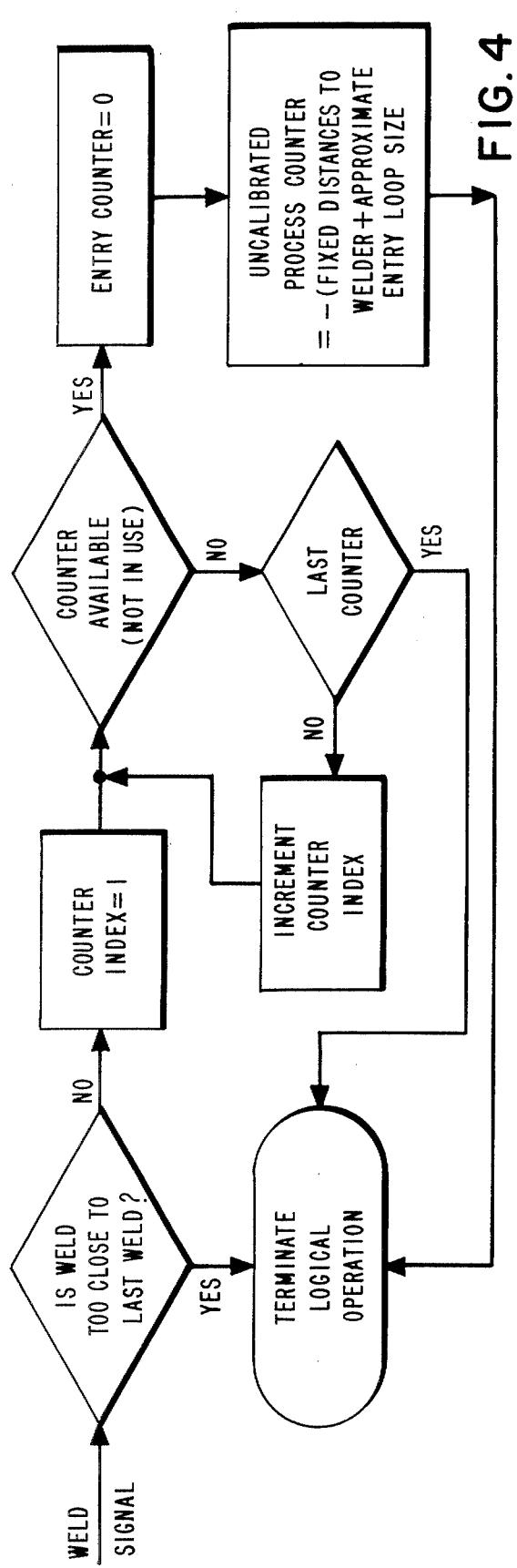
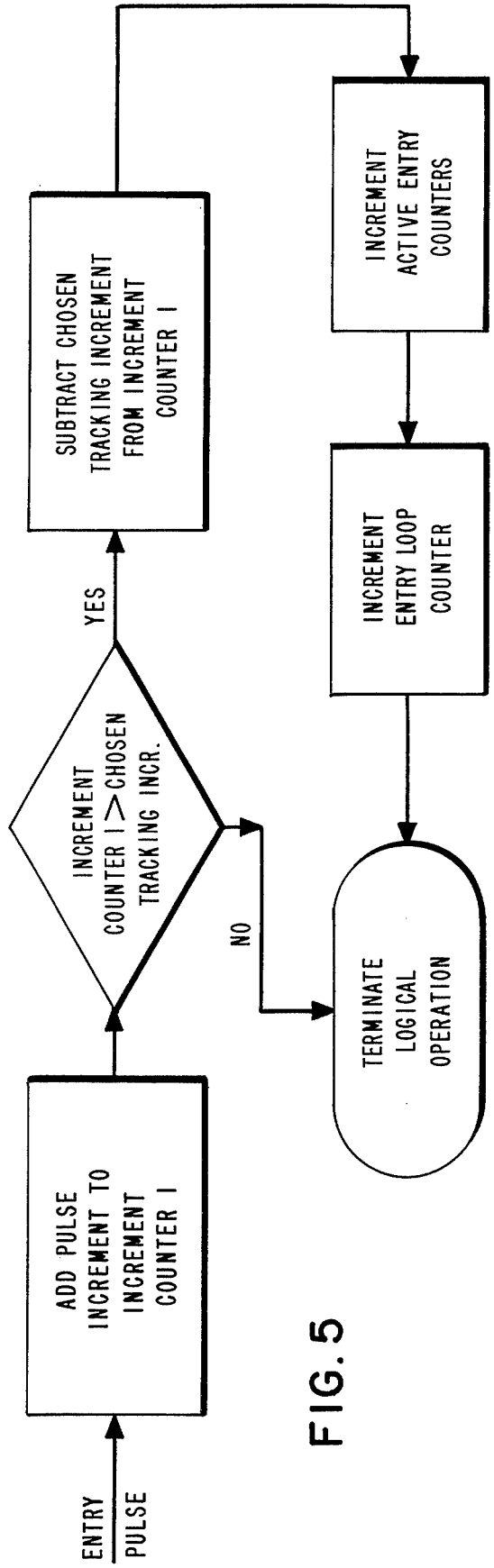
FIG. 4
FIG. 5

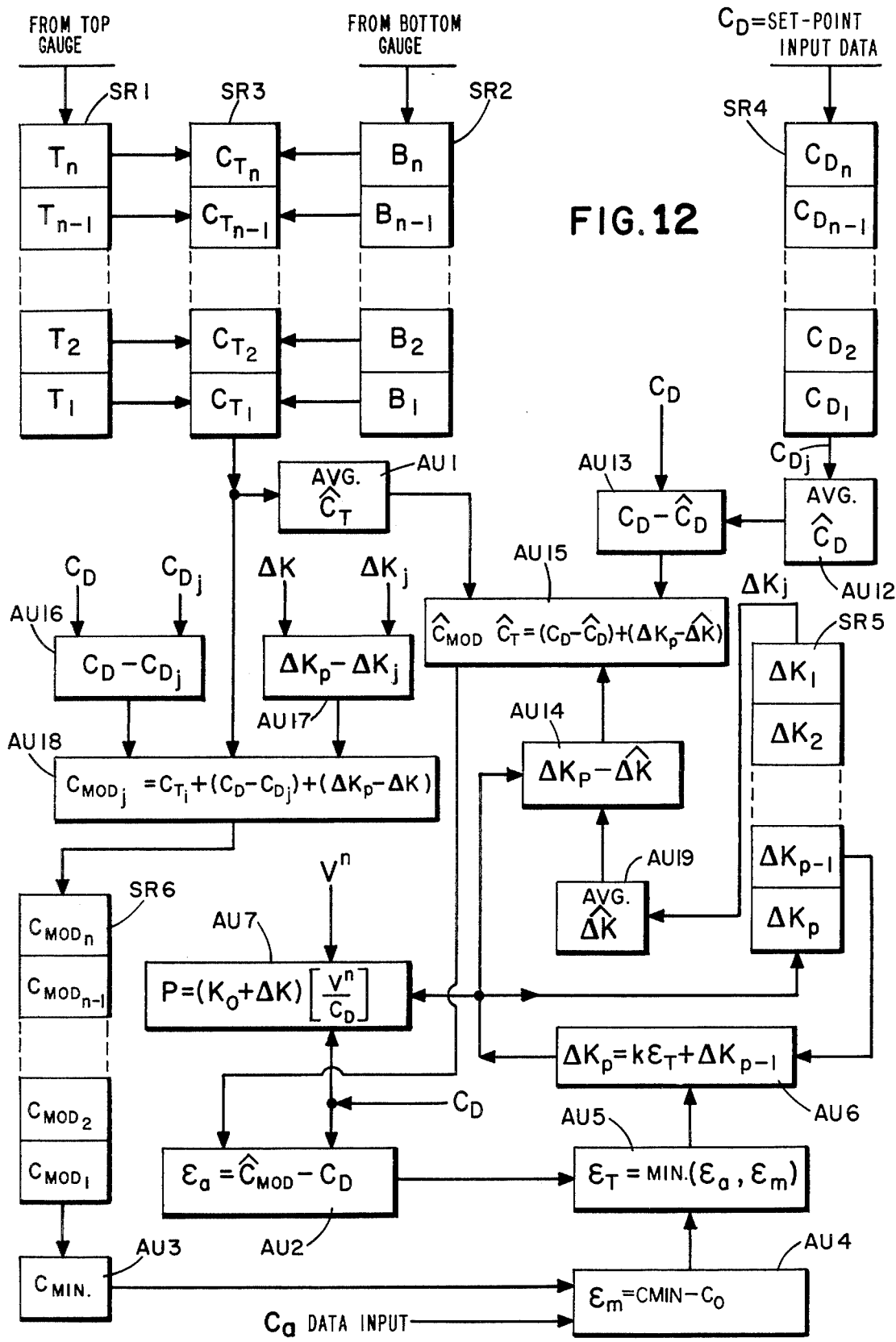

PROCESS DATA TRACKING SYSTEM

CROSS REFERENCE TO RELATED APPLICATION

This disclosure is related to Ser. No. 493,019 filed July 29, 1974 by the present inventors and entitled "Automatic Coating Weight Controls for Continuous Coating Process".

BACKGROUND OF THE INVENTION

The invention relates to a method and apparatus for tracking process and product data between various measurement and control stations on a processing line. The application discussed is a continuous galvanizing (zinc coating) line; however, the system can be generally applied to any strip processing line, including aluminum coating lines, tin coating lines, paint coating lines, etc., with measurement and control stations spatially separated. The system provides a means for continuously evaluating a process-controller action at a previous control station by tracking pertinent processing data to a measurement station where it can be used with the measurement data to determine further control action. The system also provides a means for ideal process setup by tracking information, such as where the beginning product of a new order is throughout the line, so that new set points can be applied to process controllers at exactly the correct time. For example, a typical objective of this invention might be to follow the progress of welds (new orders) through the galvanizing line, to follow processing data from the zinc pot to an in-line coating gauge, and to follow coating data, from the gauge, through the exit loop and then to the shear. This system is particularly applicable on processing lines with several discrete sections provided with variable storage capacity between sections to allow for independent control of the strip speed in each section.

Weld tracking systems that have been used in the past require that a hole be punched in or a magnetic mark be placed on the strip when a weld is made. The arrival of this hole or magnetic mark at a specific reference point along the line is then detected by special detection equipment permanently mounted in line at the reference point location. Because of this need for permanent mounting of the detection equipment, these systems are very limited in that, for economical reasons, only a small number of reference points can be accommodated. Systems of this type are highly undesirable in that the hole punching (or magnetic marking) equipment and the special detection equipment are generally unreliable and require excessive maintenance. The tracking system of this invention provides an extremely reliable and versatile weld tracking system and, in addition, provides the capability for tracking processing data through a processing line for purposes of automatic control of the process and documentation of critical processing parameters.

In a typical coating operation of the type to which this invention is directed, the strip material such as steel, aluminum, paper, etc., is moved from an entry station, which includes a weld machine for welding front ends of a new coiled strip to the rear end of a previous strip, through cleaning tanks, and then to a storage facility consisting of an entry loop section. The simplest type of entry loop consists basically of a single loop of the strip which falls into a loop pit which may typically be 50 feet deep. Alternatively, the storage loop may include sets of stationary rollers and corresponding sets of movable rollers mounted on a "loop car." The loop car is motor driven to allow the loop to be shortened or lengthened as appropriate. From the loop storage facility the strip may proceed through an annealing furnace to the coating bath, such as a molten zinc bath having a nominal temperature of about 900° F.

From the coating bath the coated strip travels upwardly in free travel a distance sufficient to cool the coating material. During this travel, the coated strip is moved past a pair of air knives located one on each side of the moving strip. These air knives force air under pressure against the coated surface to adjust the coating thickness by wiping excess coating material downward toward the bath. The air stream is typically directed at a downward angle relative to the strip and the adjustment of this angle is generally made according to the operator's preference. The air knives are also capable of movement toward and away from the strip and the pressure of the air stream is also adjustable. It has been found that the system operates most effectively by maintaining equal or near equal pressures on both sides of the strip; therefore any adjustments to the knife pressure are made equally to both knives.

From the coating station, the strip travels to a measuring station which may be several hundred feet from the air knife location; this is the closest point to the coating bath that provides an environment in which the measuring apparatus can operate effectively.

A suitable tracking system must be used to record and track such information as the coating-weight set points and pressure correction data from the air knives to the coating gauge to compensate for the dead time between any change in operating conditions at the air knives and the detection of this change by the coating gauge. Such a tracking system is described and claimed herein.

In the tracking system, coil welds are tracked on a per-foot basis from the entry welder to the air-knife position. Product data is tracked from the air-knife position to the exit shear along with weld position. The in-line tracking equipment includes three pulse tachometers located on drive bridle motors and track switches in the looper-car or storage loop area. Signals generated by these in-line devices are combined in digital logic circuits of either the hard-wired or the programmable type to effect the tracking system functions described above. Tracking accuracy is automatically recalibrated on a regular basis by looper-car or strip loop movements which cause track-switch operation at defined distance points.

BRIEF DESCRIPTION OF THE DRAWING

FIG. 4 shows a flow chart of the logic operations performed upon receipt of a weld signal;

FIG. 5 shows a flow chart of the logic operations performed upon receipt of each entry section pulse;

FIG. 12 is a block diagram of the modified pressure control circuit;

DESCRIPTION OF PREFERRED EMBODIMENT

Figure 1:
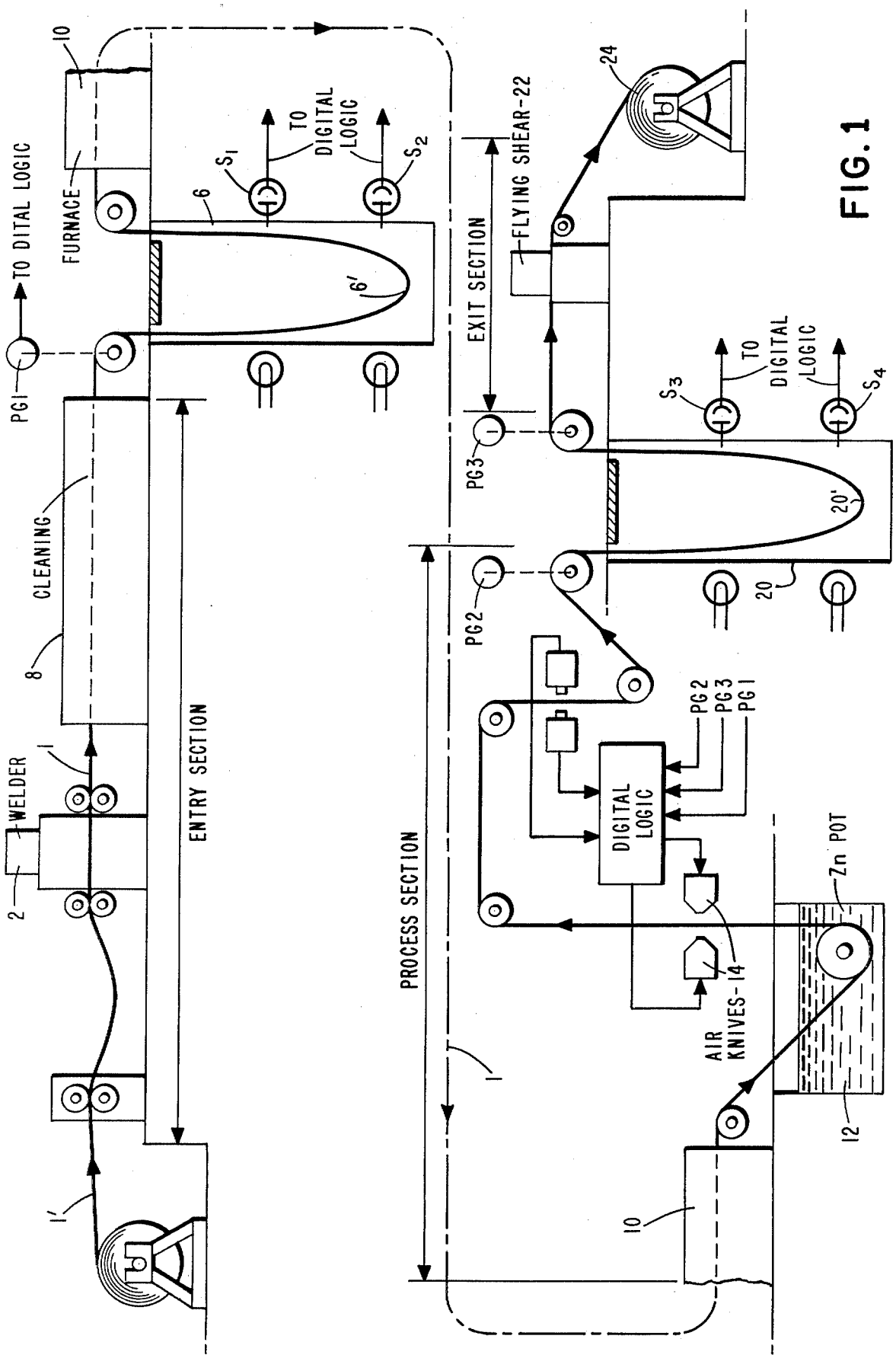
FIG. 1 shows schematically a typical continuous galvanizing line incorporating the basic tracking system sensors and control stations of this invention.

FIG. 1 shows a schematic arrangement of the units comprising one type of continuous coating line for applying zinc (galvanizing) or aluminum coatings to cold-reduced light-gauge strip steel, which arrangement incorporates features of the present invention. The arrangement can be separated into three basic sections, entry, process, and exit sections.

The entry section includes a weld station 2, at which the head end 1' of a new strip stored in a coil 4 is welded to the tail end of a strip 1 already on line. Practical limitations require that the respective head and tail ends of the strips being welded remain stationary during the welding operation. However, it is also uneconomical and impractical to stop the entire process during the welding operation. Among other reasons, stopping the process section operation, particularly when it is a coating operation, would seriously and adversely affect the coating on the product. For this reason, storage facilities must be provided between the welding station and the process section so that a store of strip can be built up sufficient to permit the process section to continue running when the entry section has stopped to permit a weld to take place.

For this purpose, the strip, after being welded, is stored in loops; in the example shown, the storage facility consists of a pit 6 in which the strip is stored in a free hanging loop 6'. The amount of strip stored in the loop is sufficient to permit the process section to continue to run at normal speed while the entry section is stopped long enough to complete the new weld.

A cleaning unit 8 is often provided to clean the strip prior to the coating application; the cleaning unit may, as shown, be provided in the entry section.

Downstream of the entry loop pit is the annealing furnace 10 through which the strip 1 passes prior to coating. The exit of the annealing furnace feeds the strip into the coating bath 12 which may be a zinc pot. Downstream of the coating bath in the process section are the air-knives 14 which jet a pressurized fluid, such as air, against the coated strip to remove excess coating therefrom and to thereby control the weight and distribution of coating on the strip. Further downstream is the measuring gauge 16 which continuously measures the coating on the moving strip and generates output signals which are fed back to the air knives through a logic circuit, such as a programmable digital computer. The coating control operation is disclosed and claimed in our copending and concurrently filed application Ser. No. 493,019 and the disclosure thereof is reproduced below with reference to drawing FIGS. 9-14, described briefly above.

Downstream of the process section is the exit section which includes an exit loop pit 20 in which is stored a strip loop 20' similar to and performing a corresponding function as the entry loop 6. Downstream of the exit loop is a shear station 22 for cutting the finished strip into required lengths. As with the weld station, the strip must be held stationary during the removal of a coil or lift of sheets. Thus, the exit loop is provided to store strip coming from the process section while the strip at the shear station is stopped for cutting and, or removal. The finished strip may be stored on takeup coils 24.

The Automatic Coating Weight Control invention relates to a method and apparatus for coating a substrate and, in particular, to a system for automatically controlling the average, minimum, and distribution of coating thickness of material produced in a continuous-coating process. The application discussed is a continuous-galvanizing line. However, the system can generally be applied to any continuous-coating process with actuators that control the coating thickness and a gauge that measures the coating thickness. The system provides a means of maintaining a given average coating weight over the width of the sheet while ensuring that a given minimum-coating weight over a spot less than the width of the sheet will also be met. The system also provides a means for periodic logging of process data such as these average- and minimum-coating weights.

In a typical coating operation of the type to which this invention is directed, the strip material, such as steel, tin, aluminum, etc., is moved from an entry station, which includes a weld machine for welding front ends of a new coiled strip to the rear end of a previous strip, through cleaning tanks, and then to a storage facility consisting of an entry loop section. The simplest type of entry loop consists basically of a single loop of the strip which falls into a loop pit which may typically be 50 feet deep. Alternatively, the storage loop may include sets of stationary rollers and corresponding sets of movable rollers mounted on a "loop car." The loop car is motor driven to allow the loop to be shortened or lengthened as appropriate. From the loop storage facility the strip may proceed through an annealing furnance to the coating bath, such as a molten zinc bath having a nominal temperature of about 900° F.

From the coating bath the coated strip travels upwardly in free travel a distance sufficient to cool the coating material. During this travel, the coated strip is moved past a pair of air knives located on each side of the moving strip. These air knives force air under pressure against the coated surface to adjust the coating thickness by forcing excess coating material downward toward the bath. The air stream is normally directed at a downward angle relative to the strip and the adjustment of this angle is generally made according to the operator's preference. The air knives are also capable of movement toward and away from the strip and the pressure of the air stream is also adjustable. It has been found that the system operates most effectively by maintaining equal pressures on both sides of the strip; therefore any adjustments to the knife pressure are made equally to both knives.

From the coating station, the strip travels to a measuring station which may be several hundred feet from the air knife location; this is the closest point to the coating bath that provides an environment in which the measuring apparatus can operate effectively.

Conventionally, coating weight measurements are made by taking test coupons from the strip and measuring the coating weight on each coupon. In compliance with ASTM (American Society for Testing and Materials) requirements, three coupons, or test slugs, are punched from the strip; the coupons are generally about 2½ inches in diameter and are taken from the center of the strip and from locations approximately 2 inches in from each edge. The slugs are weighed, then the zinc coating removed by an acid bath treatment, and the stripped slugs again weighed in order to determine the coating weight on the strip.

Two ASTM requirements must generally be met: (1) the average coating weight for all of the coupons must be not less than a first minimum average total coating weight; and (2) the coating weight for each coupon must be not less than a second minimum average coating weight. For the ASTM G-90 specification, for example, the minimum average total coating weight is 0.90 oz/ft$^2$ and each coupon must have a coating weight of at least 0.80 oz/ft$^2$. In addition, in some cases, at least a prescribed percentage of the total coating must be on each side of the test coupons. However, because of inherent system limitations, it is almost impossible to obtain an exactly uniform coating across the width of the strip from one edge to the other. In general, the edge coating thickness will be less than the specified minimum average total weight and coating thickness increases toward the center of the strip.

The principal object of the Automatic Coating Weight Control invention is to provide an automatic control over the coating operation so as to minimize the amount of coated strip material rejected either by line inspectors or by the customer due to insufficient coating weight or improper coating distribution. Moreover, this automatic control operation must be performed on a strip moving at a rate of anywhere from 200 to 1200 or more feet per minute; in the particular line for which this invention was initially developed, the strip at a rate of about 600 feet per minute.

In accordance with the present invention a digital computer is connected to various sensors and devices on a strip line including a gauge for measuring the thickness of the coating. Typically, the computer may be a Westinghouse model P2500 digital process-control computer, and the gauge may be a Nucleonic Data Systems Model 200 zinc-coating gauge. This zinc-coating gauge uses X-ray type emissions from a radioactive isotope (American 241) to measure the zinc thickness on the galvanized product. Two gauge heads (top and bottom) give independent measurements of the coating on each side of the strip. The gauge heads are mounted approximately 230 feet (70 m) downstream from the air knives on the first down pass of the cooling tower.

When controlling, the computer causes the gauge heads to continuously traverse back and forth across the width of the moving galvanized strip. During each forward traverse (operator's side to drive side of the line), the gauge heads transmit coating-weight signals to the computer. During the return traverse of the gauge heads, the computer examines the coating-weight data accumulated during the forward traverse, and determines:

1. the average coating weight on each side of the strip;
2. the total (both sides) average coating weight on the strip;
3. the coating weight at the conventional weigh-strip-weigh test locations (edge-center-edge) on the strip, as specified, for example, by ASTM Designation A525-65T; and
4. the minimum spot total (both sides) coating (covering, for example, 2½ inches or 63½ mm width) on the strip. The computer then compares these data with target (set point) specifications entered by the operator and makes the following corrective adjustments.

1. a pressure correction factor ($\Delta K$) is adjusted if either the total coating or the minimum spot does not meet specifications (the significance of $\Delta K$ will be explained later); and
2. the air-knife position (knife-to-strip distance) is adjusted if necessary to balance the coating from edge to edge and from side to side. This process is repeated after each gauge traverse.

Figure 9:
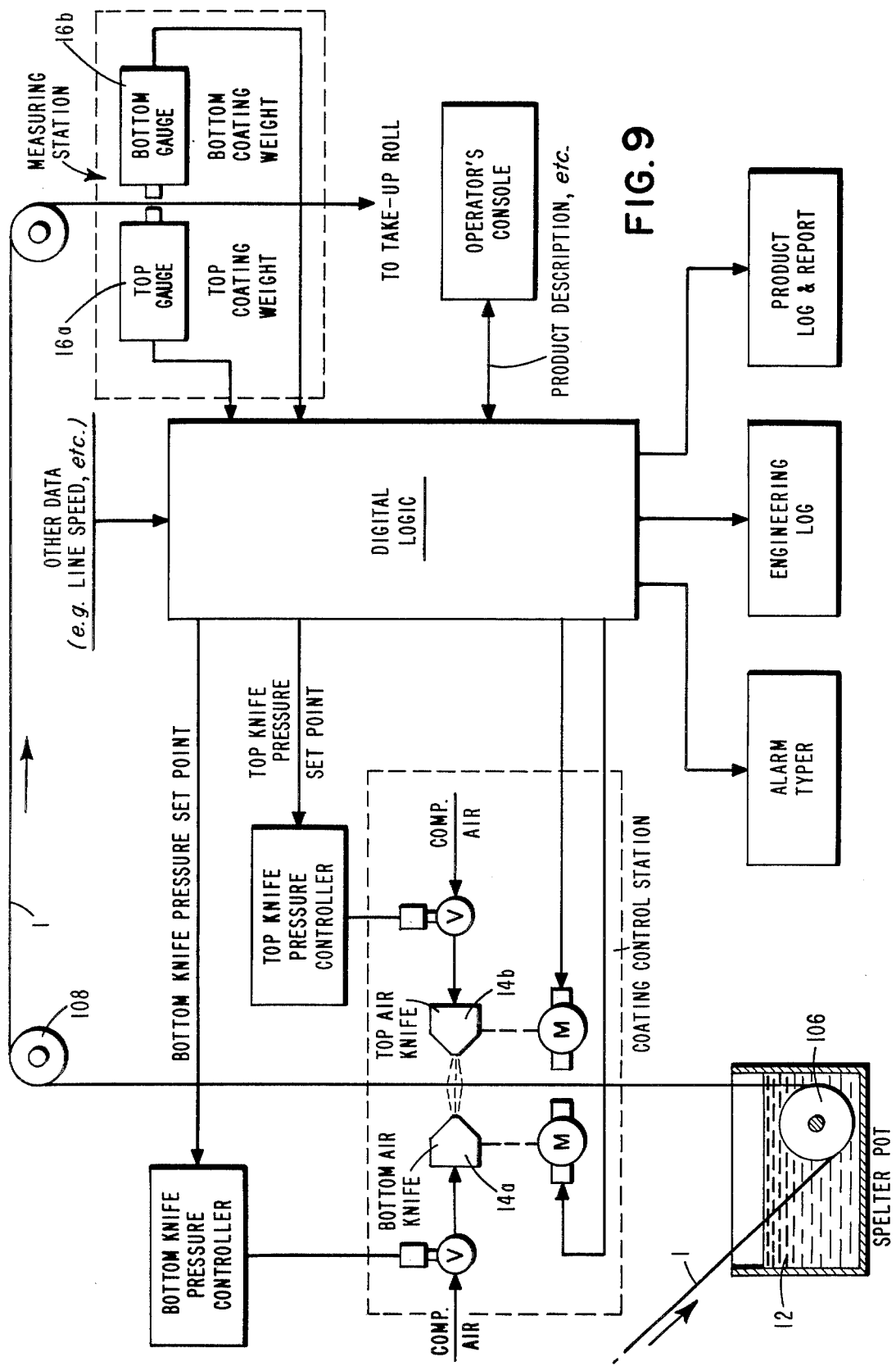
FIG. 9 is a schematic representation of the coating control system.

The basic system of the Automatic Coating Weight Control invention is shown in block diagram in FIG. 9. A strip 1, having exited from an annealing furnace or other pre-coating treatment (not shown) travels downward into a coating bath 12 containing, for example, molten zinc or aluminum at a temperature on the order of 900° F. The strip 1 travels around a roller 106 located in the bath and begins a substantially vertical upward swing to a direction changing roller 108. A vertical path is used at this point to permit the coated strip exiting from the bath to travel unsupported for a distance sufficient to cool the coating on the strip and to permit excess coating removed from the strip to flow back into the bath.

Located just above the coating bath 12 on either side of the moving strip are a set of fluid nozzles 14a, 14b which jet fluid under pressure against the coated strip to remove excess coating from the strip and thereby accomplish weight and distribution control over the applied coating. Although any appropriate fluid may be used, these devices are commonly referred to as "air knives" and are described in detail in U.S. Pat. Nos. 3,406,656, 3,459,587, and 3,607,695, for example; the portions of these patent disclosures relevant to details of the construction of the air knives are incorporated herein by reference.

The air knives direct a jet of air against the strip as it leaves the galvanizing bath which, in turn, meters the amount of molten zinc on the strip, thus regulating the coating weight. The air knives are physically located above the galvanizing bath and on opposite sides of the strip. The height of the knives above the galvanizing bath and the distance of each knife from the strip can be adjusted independently. This is accomplished by a set of eight drive motors, two motors for each end of each knife. One motor adjusts the height of the knife end above the galvanizing bath (i.e., raises or lowers the end), and one motor adjusts the horizontal distance from the end of the knife to the strip (i.e., moves the end toward or away from the strip.) Each end of each knife can be adjusted independently of the other thus permitting the knives to be skewed or twisted to assume a desirable position with respect to the strip. The position of the air knives relative to the strip determines the amount of zinc removed at a given air pressure and line operating condition (more zinc is removed as the knives are moved closer toward the strip.) Adjusting the skew or distances between the strip and the air knives provides a means of controlling the distribution of coating weight across the strip. Good coating weight control requires both air-knife pressure control and position control. Pressure changes are used to control the coating weight level and position changes are used to control the coating weight distribution across the strip and from side to side (top to bottom) of the strip. The system of this invention involves control of both air-knife pressure and air-knife position to control the continuous-galvanizing-coating process.

After passing the coating control station, the coated strip moves through a measuring station, consisting of a pair of scanning gauges 16a, 16b located on either side of the strip. The gauges measure the amount of coating on each side of the strip and generate signals representative of the measured coating weights, which signals are then utilized in a manner to be described below to adjust the pressure and position of the air knives.

After leaving the measuring station, the coated strip moves to an exit station where it is taken up and coiled or cut into sheets in a known manner.

The preferred embodiment of this invention utilizes an X-ray fluorescence on-line coating-weight gauge of the type manufactured by Nucleonic Data Systems, Inc. and designated Model 200. The gauge and its operation are described in Nucleonic Data Systems Descriptive Bulletin DB-200. The Model 200 coating-weight gauge utilizes an isotopic X-ray fluorescence technique to measure coating thickness of various materials on steel to provide a non-destructive, non-contact analysis of the coating thickness. The system consists of a measuring head mounted on each side of the strip for measuring coating weight, a head traversing system, traversing drive logic and coating weight measuring electronics together with operator control and readout console. The particular model used in this invention includes an electronic interface for transmission of measurement and status information to other equipment such as a digital computer or similar devices and to enable such external devices to control the operation of the gage measuring heads.

The measuring head emits X-ray energizing radiation and detects the resultant X-ray fluorescence. The signals are analyzed by the measuring electronics which select the desired signals to be analyzed and count the rate of occurrence of these signals. By selecting the proper X-ray signal, depending on the type of coating material being used, the count-rate is known to be related to the coating material thickness. Thus, the electronic circuitry can generate an output signal that is directly related to the coating thickness. By processing the digital count-rate information, a digital and analogue readout displaying coating thickness in ounces per square foot is achieved.

The operating mode of the gauge is selected by the line operating personnel or by digital computer logic. The measuring head can be held in standby position off the rollers, automatically scan the width of the strip, automatically sample three preset positions on the strip, or can be manually positioned anywhere on the strip. In an alternative mode, which is utilized in this invention, the entire operation is controlled by digital computer logic (or hard-wired digital logic) with minimum use of electromechanical parts susceptible to wear and tear. Coating-weight data are collected from the X-ray coating-weight gauge on a periodic basis (typically 0.5 second) as it scans the strip. In a typical application, the gauge scans the strip at the rate of one inch per second while in the data gathering mode, and retracts at the rate of four inches per second after having reached the far edge of the strip. This process of scanning and retracting is done automatically by the gauge hardware under command of the digital computer. During the time when the gauge is scanning the strip for data, the gauge moves a fixed distance (approximately 0.5inch) between sampling times; two pieces of coating information are sent by the gauge to a digital computer each ½ second. This information consists of the top and the bottom coating weights as "seen" by the gauge heads during the previous ½ second of gauge head travel.

The measuring station output, consisting of signals representing the measured coating weights, is applied to logic circuits, either in the form of hard-wired circuits or a digital computer, which operate on the measuring station data to provide signals for controlling the air knife pressure and position relative to the moving strip. Portions of the following description will refer to hard-wired logic circuits shown in block diagram form and others to flow chart diagrams representing programmable instructions to a digital computer. In the present invention, a Westinghouse P2500 Process-Control Computer is employed although other digital computers are also suitable. The P2500 computer is described in Westinghouse bulletins EB-23-301, May 1971; B-135, January 1971; B-144, October 1971; B-132, revision 1, March 1971; and SA-126, October 1971. Although certain portions of the disclosure refer to hard-wired logic and others to flow charts, it is readily apparent that one can be derived from the other or vice versa.

The control logic of this invention controls two aspects of the air knives: the air pressure and the knife position relative to the strip. Pressure changes are used to control the coating-weight level, and position changes are used to control the coating-weight distribution. The necessary pressure is determined from a mathematical model which relates air pressure to coating-weight set point, air knife geometry, and strip line speed. The equation representing the coating weight-pressure model used is:

$$P = (K_o + \Delta K)(V^n/[C_D])$$

where:

$K_o$ = position factor.
$\Delta K$ = pressure correction factor.
$V$ = strip speed.
$n$ = an exponent (typically 1.4) which is constant for a given galvanizing line.
$C_D$ = average coating weight set point.

Figure 10:
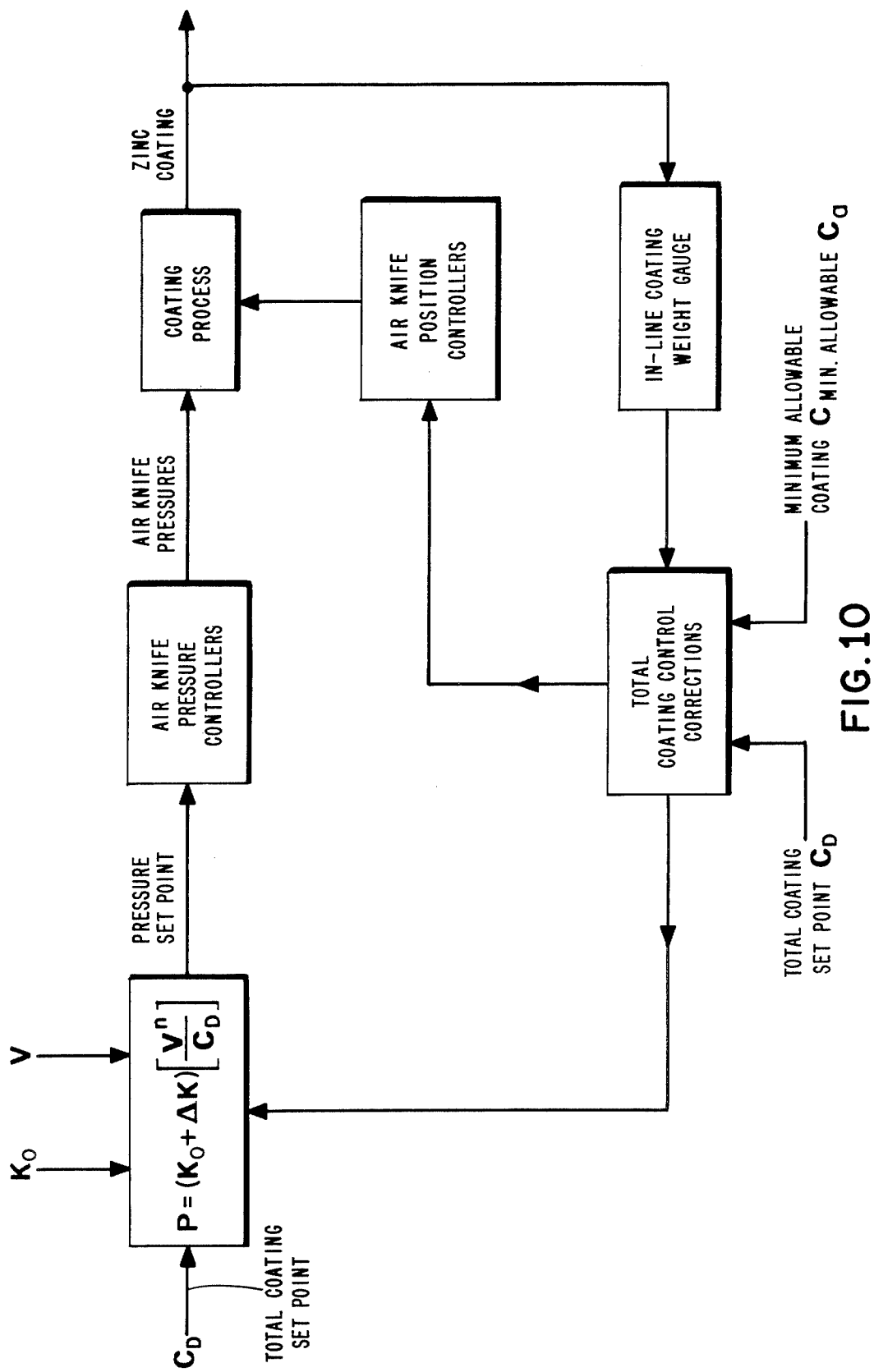
FIG. 10 is a block diagram representation of the principal features of the control system.

A block diagram of the air knife pressure control system is shown in FIG. 10. The average coating set point $C_D$ and the minimum spot coating set point $C_a$ are entered into the logic circuit by the operator; typically this is accomplished by manually setting the appropriate set point values into the computer from thumbwheel switches or similar devices on an operator console or by means of data cards containing a product code. The position factor $K_o$ is preferably set at a nominal value, based on previous experience, depending on the horizontal, vertical, and angular positions of the air knives when control is initiated. Although $K_o$ can be determined experimentally, typically, the operator will set the air knife pressure at an initial value; since the average coating set point $C_D$, the strip line speed V, and the operator-set pressure, P are known, an initial value of $K_o$ can be calculated using the mathematical model given above. A typical value of $K_o$ would be 0.000750. Initially $\Delta K$ equals zero.

The initially preset and subsequently calculated air knife pressure set point P controls air knife pressure controllers to adjust the pressure output of the air knives. These pressure controllers can be in the form of electro-pneumatically operated valves which adjust the air pressure flowing through the valves in proportion to an applied electrical signal. A typical air supply and control system is shown in U.S. Pat. No. 3,494,324 To Bauer et. al. This patent discloses a system for controlling air pressure as a function of the strip line speed. Air pressure to the knives is controlled by a butterfly valve which may be modified so as to be controlled by the pressure set point signal P to adjust the air knife pressure as a function of the control system of this invention.

As the coated strip moves down the line, it passes through the measuring station containing the scanning X-ray gauges. In the normal automatic operating mode, the gauge (which includes source and detecting heads on both sides of the strip) traverses the width of the strip which may typically be 62 inches, at a speed of about 1 inch per second in the data gathering mode with sampling information being obtained and sent to the computer each ½ second. This information consists of top and bottom coating weights for each sampled position.

In terms of hard-wired components, the sampled coating weight data is entered into two shift registers, each shift register containing at least as many storage blocks or cells as there are possible sample positions, i.e., maximum possible strip width in inches divided by ½. Thus for a maximum 62 inches wide strip there would be at least 124 sampling positions. Because the measuring station is located a considerable distance from the coating station (in the present system this distance is 230 feet), two additional pieces of information must be stored in corresponding additional shift registers at the same time that the sampled coating weight information is being fed to the first two shift registers; these are the coating weight set points and the pressure corrections factor for that portion of the coated strip being measured. A suitable tracking system must be used to record and track such information as the coating-weight set points and pressure correction factor from the air knives to the coating gauge to compensate for the dead time between any change in operating conditions at the air knives and the detection by the coating gauge of this change. Such a tracking system is described and claimed here.

For the sake of simplicity and ease of understanding, this invention will be first described using the assumption that there is no delay between the coating and measuring stations; later, the modifications required by the delay which occurs in practice will be discussed.

Figure 11:
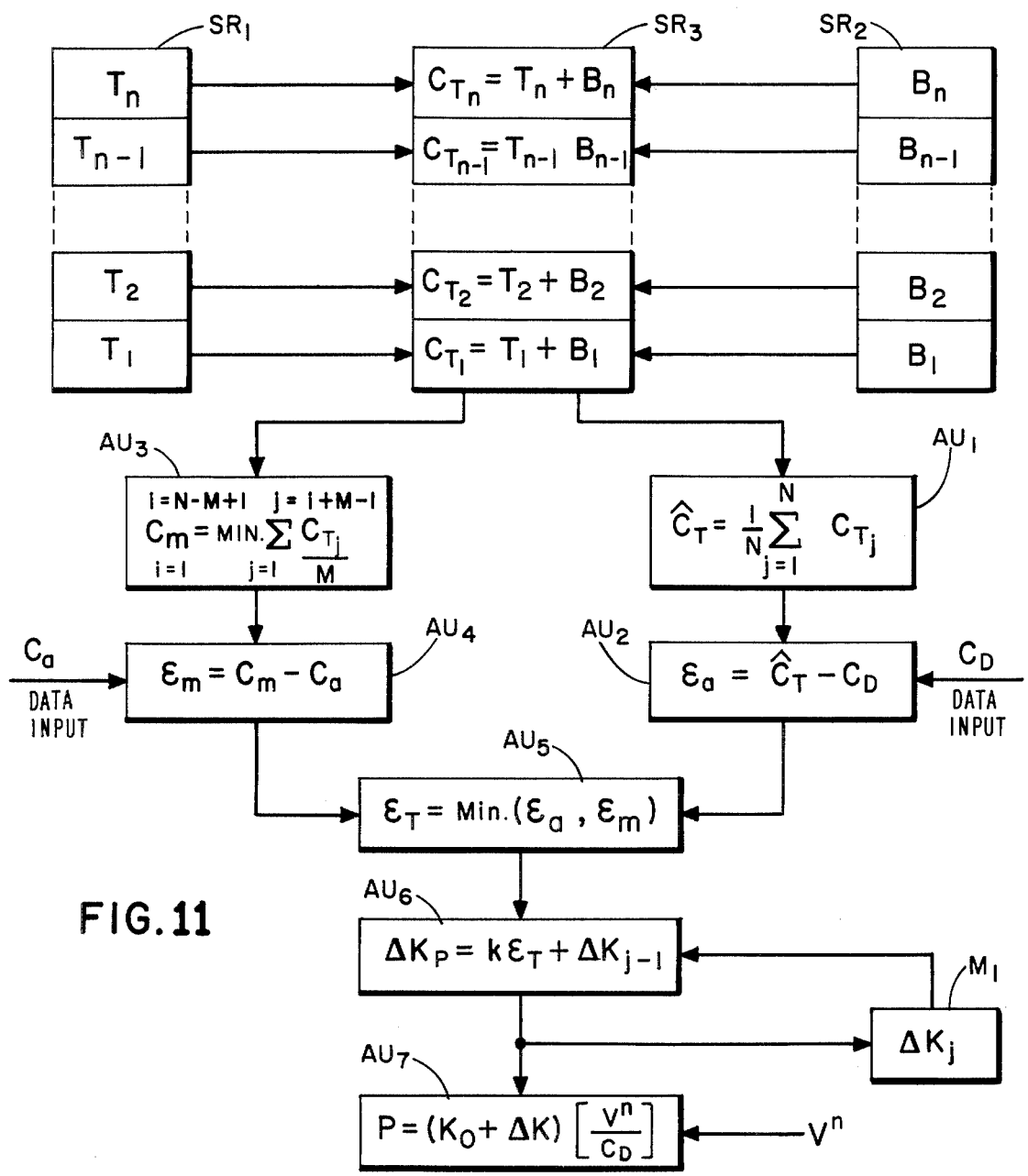
FIG. 11 is a block diagram of the pressure control circuit.

As noted above, during the scanning traverse of the measuring gauge, the information corresponding to coating weight measured at each sampled position across the strip is stored in a storage device, such as a shift register. As shown in FIG. 11, the measured top and bottom coating weights $T_j$ and $B_j$, respectively, are stored in separate registers $SR_1$ and $SR_2$. Upon completion of the data gathering scan, the measuring head performs a non-scanning retrace across the strip at a higher rate than the scanning trace; in practice, the retrace rate is approximately 4 inches per second. All calculating and control adjustments are made during this retrace period. The only operations performed during the scanning trace are the collecting and storing of coating-weight data in the shift registers $SR_1$ and $SR_2$ and the adjustment of the air knife pressure as a function of the strip line speed and coating set point changes. However, if desired, the system could be modified to also calculate and control during the trace period and to also collect data during the retrace period.

Figure 13:
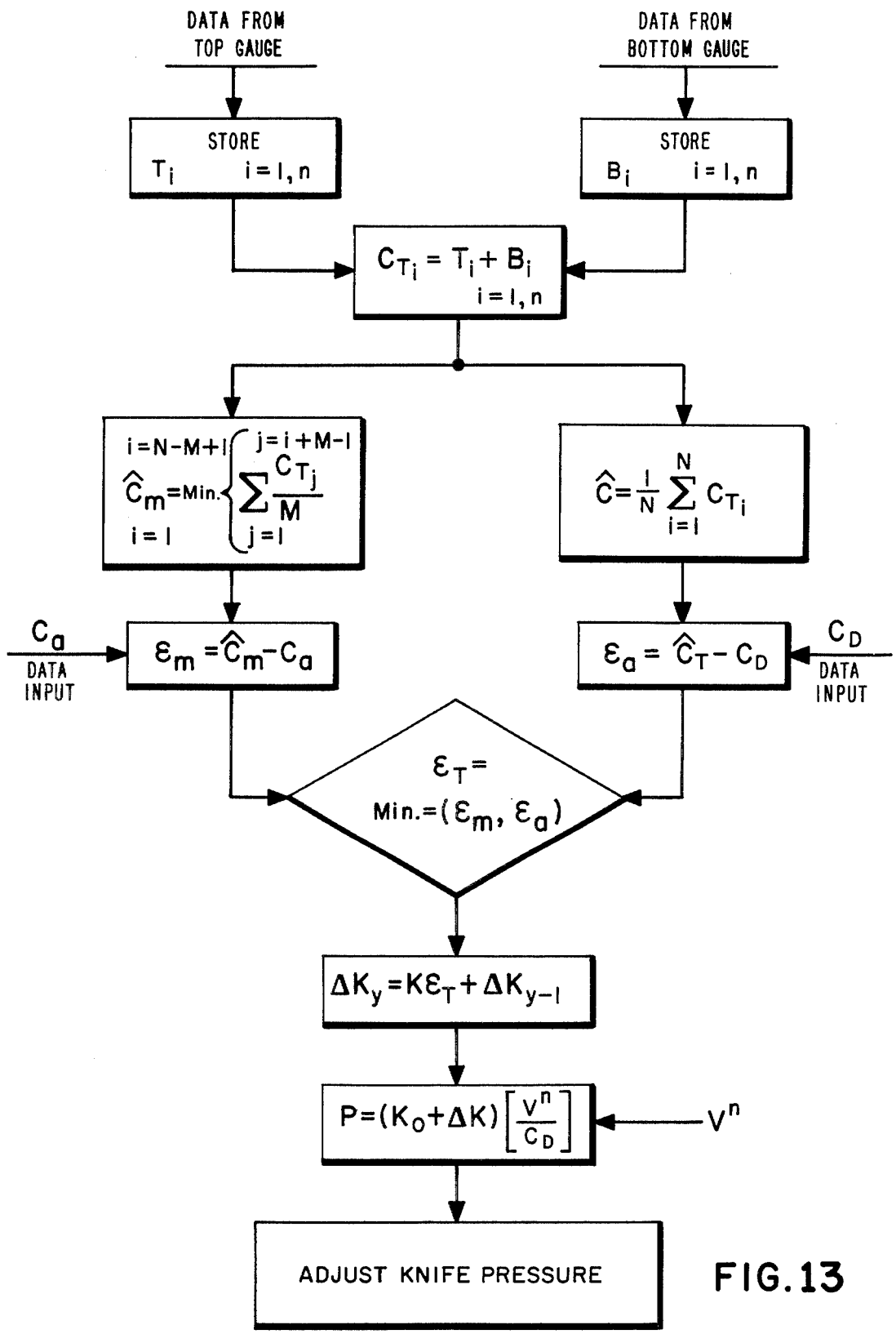
FIG. 13 is a flow chart of the pressure control operations performed by the digital computer.

Control of the air knife pressure is based on the difference between the measured coating-weight data and coating-weight set point data representing the average coating weight and the minimum spot coating weight. The pressure control operation can be accomplished either by suitably programming the P2500, or similar computer, or with a hard-wired logic circuit as shown schematically in FIG. 11. A corresponding flow chart, from which the programmer could develop the appropriate instructions for the P2500 computer, is shown in FIG. 13.

Referring to the hard-wired logic of FIG. 11, the measured top and bottom coating weights for each scanned position are added together and stored in a third shift register $SR_3$; register $SR_3$ should contain at least as many storage blocks or cells as shift registers $SR_1$ and $SR_2$. Register $SR_3$ now contains the total coating weight for each scanned position on the strip. These weights are then averaged in averaging circuit $AU_1$ (AU designates well known arithmetic units available commercially as modular units from various manufacturers). The output of circuit $AU_1$ is a signal $\hat{C}_T$ representing the average measured weight of the coating on both sides of the strip. This signal is applied to one input of arithmetic unit $AU_2$ and the selected average coating weight set point $C_D$ (which is a standard value forming part of the product code designation and is typically based on ASTM requirements) is applied to a second input of circuit $AU_2$. This unit calculates the difference between the average total coating weight $\hat{C}_T$ and the average coating set point $C_D$ to produce error signal $\epsilon_a$.

Another circuit, designated $AU_3$, calculates the minimum measured spot coating weight. This is done by averaging successive groups of measured incremental total coating weights stored in $SR_3$ and then selecting the lowest calculated group average. If the storage cells of register $SR_3$ are designated $C_{T1}, C_{T2}, \ldots, C_{Tn}$, and the number of values averaged in each group corresponds, for example, to M=5, to reflect coating over an area equivalent to the conventional ASTM weigh-strip-weigh (WSW) test coupon, then circuit $AU_3$ will calculate the average of successive groups consisting of cells $C_{T1}$ to $C_{T5}$, $C_{T2}$ to $C_{T6}$, $C_{T3}$ to $C_{T7}, \ldots, C_{Tn-4}$ to $C_{Tn}$ and the output of $AU_3$ will consist of a signal $C_m$ representing the smallest of these averaged values.

Figure 11A:
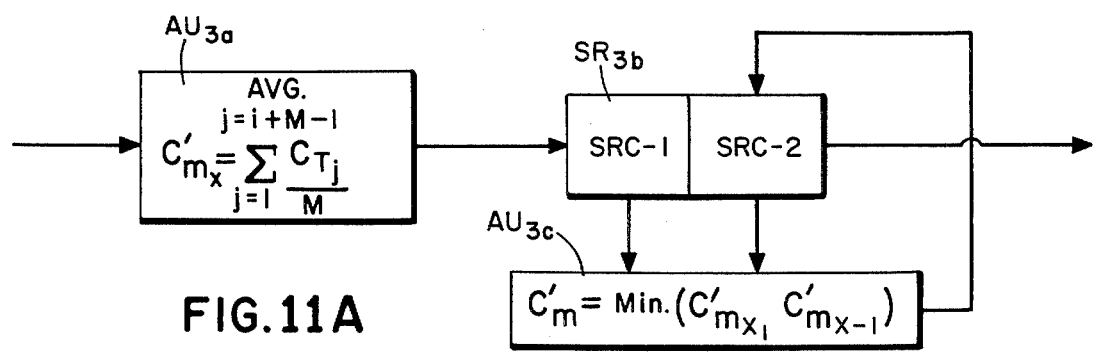
FIG. 11A is a block diagram of the minimum spot coating circuit.

A relatively simple circuit for accomplishing the minimum spot selection is shown in FIG. 11A and it includes an averaging circuit $AU_{3a}$ connected to register $SR_{3b}$ through appropriate switching circuits to accomplish the sequential group of M averaging; the output of averaging circuit $AU_{3a}$ is applied to a 2-cell shift register $SR_{3b}$, which may be of the destructive read-out type. Register cell SRC-1 stores the most recent spot coating weight value calculated by $AU_{3a}$ and cell SRC-2 stores the previous calculated spot coating weight. The shift register cells are connected to a comparator circuit $AU_{3c}$ which compares the spot coating weights stored in the register $SR_{3b}$ and stores the smaller of the two compared values in cell SRC-2. The next succeeding calculated spot coating weight is then supplied to cell SRC-1 for subsequent comparison with the value stored in cell SRC-2. This operation continues until each group of M cells of register $SR_3$ have been averaged and compared and the last calculated minimum spot coating weight value has been stored in cell SRC-2.

The calculated minimum spot coating weight $C_m$ is then applied to one input of circuit $AU_4$; the minimum spot coating weight set point value $C_a$ is applied to a second input of circuit $AU_4$ which then calculates the difference of these two values to provide an error signal $\epsilon_m$. The predetermined minimum spot set point $C_a$, like set point $C_D$, is a known function of the product code and typically related to ASTM standards.

Both error signals $\epsilon_a$ and $\epsilon_m$ are applied to respective inputs of comparator circuit $AU_5$ which selects the more negative of the error signals $\epsilon_a$ and $\epsilon_m$ for use in further computations. The selected error signal becomes the absolute system error $\epsilon_T$.

The output $\epsilon_T$ of circuit $AU_5$ is fed to an input of circuit $AU_6$ which calculates the pressure correction factor according to the equation:

$$\Delta K_p = k\epsilon_T + \Delta K_{p-1}$$

where:

$k$ is a gain factor which determines the dynamic response of the control system, $\Delta K_o = 0$ $\Delta K_p$ is the pressure correction factor for the pth scan, and $\Delta K_{p-1}$ is the pressure correction factor for the immediately preceding scan of the measuring heads.

The latest value of $\Delta K$ calculated in circuit $AU_6$ is applied to calculating circuit $AU_7$ and to a single cell memory $M_1$ where it is stored until the next correction is to be calculated. Memory cell $M_1$ may be part of a larger register $SR_5$ as shown in FIG. 12. Circuit $AU_7$ calculates the pressure control signal P which is applied, as discussed above, to control the fluid pressure of the air knives. The net effect of this process is an integral-type controller, having a gain, $k$. The computer then adjusts the air-knife pressure, if necessary, in accordance with the mathematical model given above to maintain the desired average coating weight, or to raise the coating-weight average above the set point, if necessary, to maintain the required minimum spot coating.

FIG. 12 shows a modified form of the pressure control logic circuit of FIG. 11. The circuit of FIG. 12 takes into account the delay factor resulting from the distance between the air knives and the measuring gauge. The circuit elements of FIG. 12 which correspond to those described above relative to FIG. 11 are identified with the same reference designations as the corresponding elements of FIG. 11.

During the time that it takes a given point of the coated strip to move from the air knives to the measuring gauge the operator may have modified the coating set points $C_D$ and $C_a$ due to a change in customer order specifications. A shift register $SR_4$, having the same number of storage locations as registers $SR_1$–$SR_3$, is provided to store the average coating weight set point data $C_{Dj}$ for each scan increment. The $C_{Dj}$ values are made available for storage in $SR_4$, for tracking through the process section, as described below. The incremental set point data is averaged in averaging circuit $AU_{12}$. The output of circuit $AU_{12}$ is applied, along with the current set point $C_D$ to circuit $AU_{13}$ to obtain the difference between the current set point $C_D$ and the calculated average set point.

The current set point is the latest set point value set into the computer by the operator and may be different from the set point set into the computer at the time the strip position being measured was passing through the coating station.

A further shift register $SR_5$ is provided to store previous pressure correction factor data for subsequent use. Like the $C_{Dj}$ data described above, previous pressure correction factor data ($\Delta K$) is made available for storage in $SR_5$ by the tracking system of this invention. Only one adjustment of the pressure correction factor is made during a scan period; however, as the measuring gauge traverses the strip, the strip is also continuously moving past the gauge; thus, an adjustment corresponding to point $j$ on the strip being measured may be different from the adjustment made when points $j-1$ or $j+1$ were passing through the coating station. The stored incremental pressure correction factors are then averaged in averaging circuit $AU_{19}$ and the difference between the latest correction and the averaged corrections is determined in circuit $AU_{14}$. This averaging represents a very simple technique for compensating differing pressure correction factors within a scan. More sophisticated techniques are, of course, possible.

The outputs of each of circuits $AU_1$, $AU_{13}$, and $AU_{14}$ are applied to adding circuit $AU_{15}$ to obtain a modified measured average coating weight $\hat{C}_{MOD}$. This modified measured average coating weight is applied, along with the current average coating set point $C_D$, to error determining circuit $AU_2$ to determine the error $\epsilon_a$ between the measured average coating weight and the current average coating set point.

Modified incremental total coating weights $C_{MODj}$ are also calculated as follows. The difference between the current minimum spot set point and the stored minimum spot set point $C_{Dj}$ corresponding to the strip location $j$ is calculated in circuit $AU_{16}$; similarly, the difference between the latest pressure correction factor $\Delta K_p$ and the pressure correction factor $\Delta K_j$ corresponding to the strip location $j$ is calculated in circuit $AU_{17}$. The outputs of circuit $AU_{16}$ and $AU_{17}$, along with the incremental total coating weight $C_{Tj}$, are added in circuit $AU_{18}$ and the results stored in shift register $SR_6$. This shift register $SR_6$ will then contain the modified incremental measured total coating weights $C_{MOD1}, \ldots, C_{MODn}$.

The measured minimum spot coating weight is calculated, as described above with respect to FIG. 11, in circuit $AU_3$ utilizing the values stored in $SR_6$ instead of those stored in $SR_3$ and the error between the modified measured minimum spot coating weight $C_m'$ and minimum spot coating set point $C_a$ is calculated in circuit $AU_4$. The system error $\epsilon_T$ is then determined in circuit $AU_5$ and the pressure correction factor determined in circuit $AU_6$, as described above.

The second type of control function performed by this system relates to the control of the position of the air knives relative to the coated strip. Specifically, the ends of the air knives are made adjustable to provide a means for controlling the distribution of coating weight on the strip. Thus, by moving one or more of the knife ends, either toward or away from the strip or in the direction of travel of the strip, the air jet slot can be skewed in two directions. The movements of the knives themselves are controlled by AC motors, two for each knife end, to move that end toward and away from the strip or up and down in a plane more or less parallel to the plane of the strip. Typically, the motors are relay operated and a motor will be energized, by closing the relay upon receipt of an appropriate signal from the logic circuit, for a preset period, for example, on the order of ½ to 1 second. A ½ second motor operation will result in a knife end movement of about 1/32 inch, sufficient to produce a measurable change in the coating weight.

For purposes of this discussion, only the corrective action in the form of an in/out movement of the air knife end will be described. A corrective action consisting of an in/out movement of the end of the air knife will be made only if that particular end is eligible for movement. Because of stability and dead-time compensation requirements, eligibility for an end to be moved is determined as follows, an end being eligible for corrective action if (1) the material influenced by the last air-knife position change has passed the coating gauge; and (2) the proposed movement does not constitute a second consecutive movement of the same air knife. Also, only one knife end may be moved during any one gauge scan period (a scan period includes the data gathering scan and the retrace, during which no data is collected.) For example, if one end of the top knife is corrected at the end of a particular gauge scan, the bottom knife cannot be considered eligible for correction on that same scan. Also, if an end of the top knife had made a corrective movement during the previous gauge scan period, it cannot be considered eligible for correction during the present scan period. The operation of the air-knife position control is designed to ensure an equal, or near equal, coating at similar locations near the edges of both sides (top and bottom) of the strip.

Data for the knife end position control is obtained in the following manner. As described above, incremental measured coating weight data is stored in, for example, the several cells of shift registers $SR_1$ and $SR_2$; thus these registers provide a representation of the coating weight as measured across the width of the strip. Certain groups of these cells can be considered to correspond approximately to the positions on the strip from which, in previous practice, test coupons were punched. Under the ASTM standards the (WSW) test coupons are slugs having a diameter of 2½ inches with the edge slugs or coupons being taken from a point 2 inches from each edge of the strip. In the preferred embodiment of this invention, each measuring increment has a width of ½ inch; therefore five measuring increments correspond to one ASTM coupon. The corresponding data obtained from the measurements according to the present invention would be stored in cells $T_5$–$T_9$ and $T_{n-9}$–$T_{n-5}$ of shift register $SR_1$ and in memory cells $B_5$–$B_9$ and $B_{n-9}$–$B_{n-5}$ of shift register $SR_2$. The five values in each group are averaged together in, for example, averaging circuits similar to any of the circuits $AU_1$, $AU_{12}$, or $AU_{13}$, to obtain four values corresponding to ASTM test coupons and referred to hereafter as test coupon data. These four edge coating weights are then averaged together to yield an edge coating weight set point. This edge coating weight set point is then compared with each individual test coupon data. If the difference between the edge coating weight set point and an individual test coupon data exceeds a predetermined tolerance, a control signal is applied to the appropriate knife end to effect the necessary correction to that end to bring the variant weight into line with the prescribed tolerance level.

Figure 14:
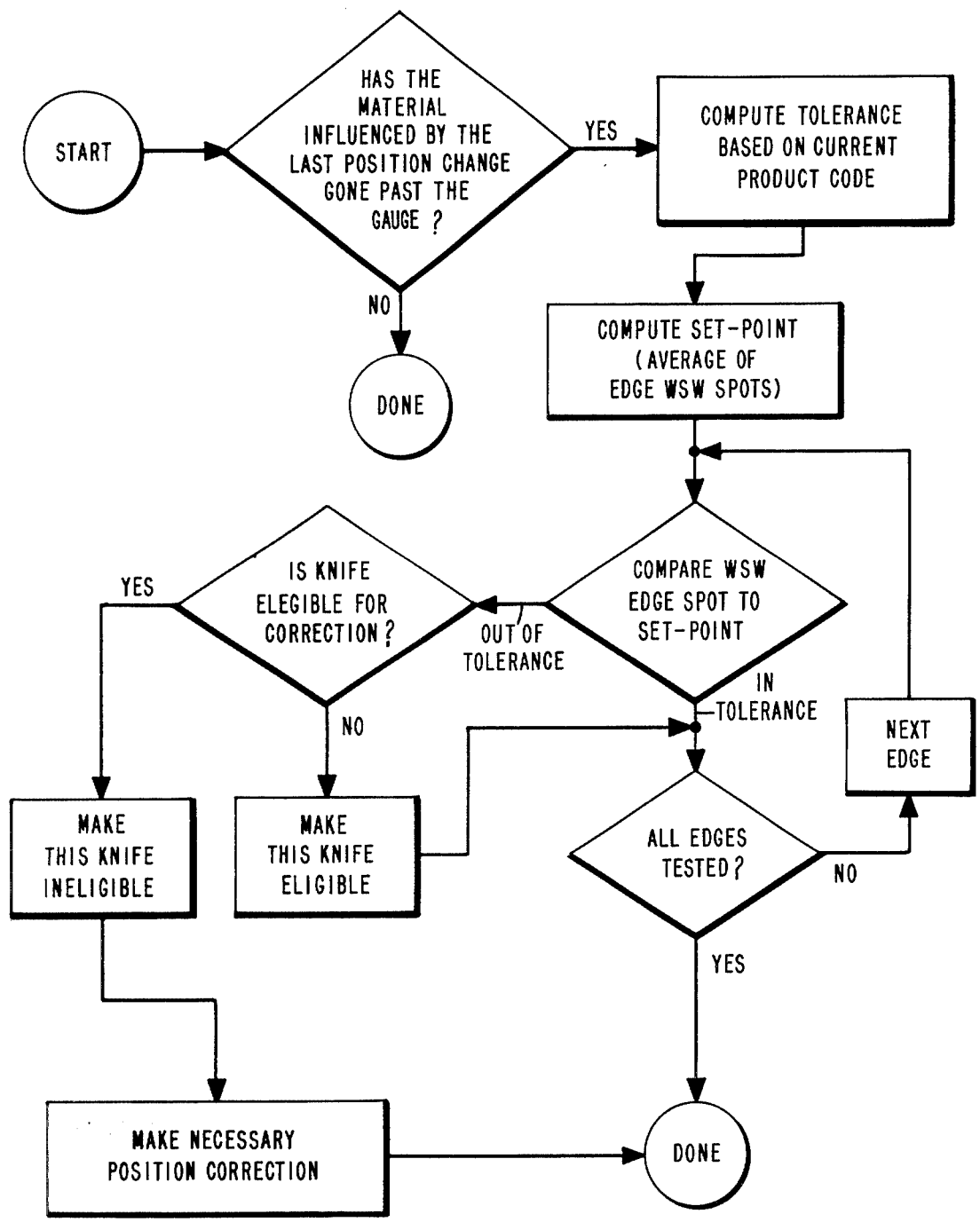
FIG. 14 is a flow chart of the air-knife position control functions performed by the digital computer.

The flow chart of FIG. 14 represents the operations performed by the P2500 computer and includes those operations based on the delay between the coating and measuring stations.

The tracking information supplied from the Process Data Tracking system is supplied to an appropriate input of the P2500 computer. The tracking information includes a position check which locates a given point on the strip as it travels through and past various operating stations. For purposes of the air knife position control, information indicating that an air knife position change has been made is supplied to the tracking system and this information is moved through the tracking system at a rate which follows the strip so that the point on the strip at which the air knife position change was made can be tracked accurately from the air knife (coating control station) to the measuring gauge (measuring station). The computer is instructed to detect the passage of the last position change information through the tracking system location corresponding to the measuring gauge position.

If the physical limitations of the coating operation (e.g., heat, dust, etc.) were not present so that the measuring station could be placed immediately adjacent and contiguous with the air knife station, the position control system could effectively eliminate this step.

When the computer has determined that the point on the strip at which the knife position correction was made has passed the gauge, the computer is instructed to calculate the tolerance limits based on the current product code information (as distinguished from product code information in effect when the point on the strip now passing the measuring gauge was passing the air knife location) to determine the currently allowable test coupon weight deviations from the computed average weight. If the product code has been changed during the time the strip moves from the air knife location to the measuring gauge location, the tolerance limits will or may also have been changed. An exemplary tolerance limit value for a typical G-90 product (ASTM designation) is 0.03 to 0.05 ounces per square foot.

In some cases the product code will be changed during the coating operation due to new customer specification requirements; for instance, one customer order may be finished and product code information relating to a new customer order will be entered into the logic network. It will be seen, therefore, that the measured coating weight data stored in the cells of shift registers $SR_1$ and $SR_2$ must be modified to take into account the delay factor resulting from the distance between the air knives and the measuring gauge. This procedure is made possible by means of the Process Data Tracking system as well as by the novel system of basing current coating weights on previous coating weights as a function of the changed product code as described in the modified pressure control logic of FIG. 12.

The test coupon data is calculated, as described earlier, to obtain average weight value (designated the set point average) for the four measurement areas. Because of the rules governing air knife movement, the computer is instructed to compare each set of test coupon data with the set point average sequentially in a predetermined order. For convenience, the test coupon data corresponding to the edges of the top of the strip will be designated A and B, respectively, and for the bottom of the strip C and D, respectively. Thus, for example, the computer will first compare edge A data with the set point average; if the edge A data is determined to be within the computed tolerance limits, the computer will next test edge B data and so on through the testing of edge D data. If all of the test coupon data are found to be within the computed tolerance limits, no further corrective action is taken and the position control operation is terminated.

If the edge A data is found to be outside the computed tolerance limits, the computer will then determine whether the knife end corresponding to strip edge A is eligible for a corrective movement. If this knife end is found to be ineligible—that is, a corrective movement was made to that knife end during the immediately preceding scan period then the computer is instructed to make this end eligible for corrective movement during the next immediately succeeding scan period.

If edge A data was found to be within the computed tolerance limits, the computer is next instructed to test edge B data, (i.e., compare the edge B test coupon data with the set point average) otherwise, the computer will proceed to test edge C data. If edge B is found to be within the prescribed tolerance limits, the computer is then instructed to compare edge C data with the set point average; if the edge C data is found to be out of tolerance, the computer again determines whether the knife end corresponding to strip edge C is eligible for correction. If knife end C is found to be eligible, a control signal is generated to operate the appropriate AC motor controlling end C to produce a short movement during the next scanning period and the computer is instructed to terminate the position control operation for the rest of this current scan period. The position control operation is terminated immediately upon the making of the first corrective knife movement during a scan period or after each edge has been tested, whichever occurs first.

Also, it will be noted here that, with only slight modification, the air knife position control function described above can be used to provide a differentially coated strip (unequal top and bottom coatings) if desirable. This modification consists of applying a multiplier to the set point average (average of the four test coupon data) before comparing each test coupon data with the set point average. The multiplier used with test coupon data from that side of the strip where the greater coating is desired would be greater than the multiplier used with the test coupon data from the other side. Typical values would be 1.0 for that side of the strip where the greater coating is desired and 0.5 for the other side. The ratio of these two multipliers, of course, determines the relative coating on each side of the strip.

It will be noted here that by allowing the test coupon data on each side (top and bottom) of the strip to use a different multiplier, a prescribed percentage of the desired coating weight set point can be deposited on each side of the strip.

Although, for simplicity, the above description comprehends only test coupon data from a single scan, in practice it has been found desirable to use an average test coupon data based on the present scan plus at least one previous scan. In a typical application the number of scans averaged may range from two to four.

The disclosed control system provides a means for allowing the average coating weight of material produced in a continuous-coating line to vary between a minimum acceptable value and a maximum value sufficiently high to ensure that a minimum spot coating weight specification will always be met. It also provides a means of controlling the distribution of coating weight such as to cause the coating weights on the edges of the strip to vary within a given tolerance of each other.

The tracking system of this invention receives information from three pulse generators, PG1, PG2, and PG3. These are digital tachometers which provide a pulse (electrical contact closure) whenever a roll turns a fixed distance. A typical type of digital tachometer which can be used in this invention is the Farmer Electric Rotatimer, Model 2, manufactured by Farmer Electric Products Co., Inc. and described in product bulletin B-120 Rev. 1, 6/70. The tracking system uses the digital tachometer signals in conjunction with digital logic circuits of either the hard-wired or the programmable type to provide information concerning the progress of incremental lengths of the strip through the line.

Three tachometers are used because on the continuous galvanizing line the three sections, entry, process, and exit sections, may travel at independent speeds and therefore must be treated independently of each other. The three digital tachometers provide a means for driving the tracking system based on the various combinations of operating conditions that may exist at any given time.

The tracking system provides a means for tracking two types of data, event data and processing data. Event data include information such as the location of welds and other strip discontinuities in the line. Event data are tracked in a series of counters, such that the contents of each counter at any given time reflect the location of an event with respect to a specific reference point in the line. Processing data, such as air pressure corrections on the coating control knives at the zinc pot and coating set points, are tracked from various stations to other stations in the line. The processing data are stored in a bank of memory devices (cells) and moved in the memory from cell to cell as the strip moves from station to station so that the contents of each memory device in the bank at any given time reflects past processing conditions for an incremental length of strip located in the line at a point corresponding to the location of that data in the memory bank.

Event Data Tracking

Figure 2:
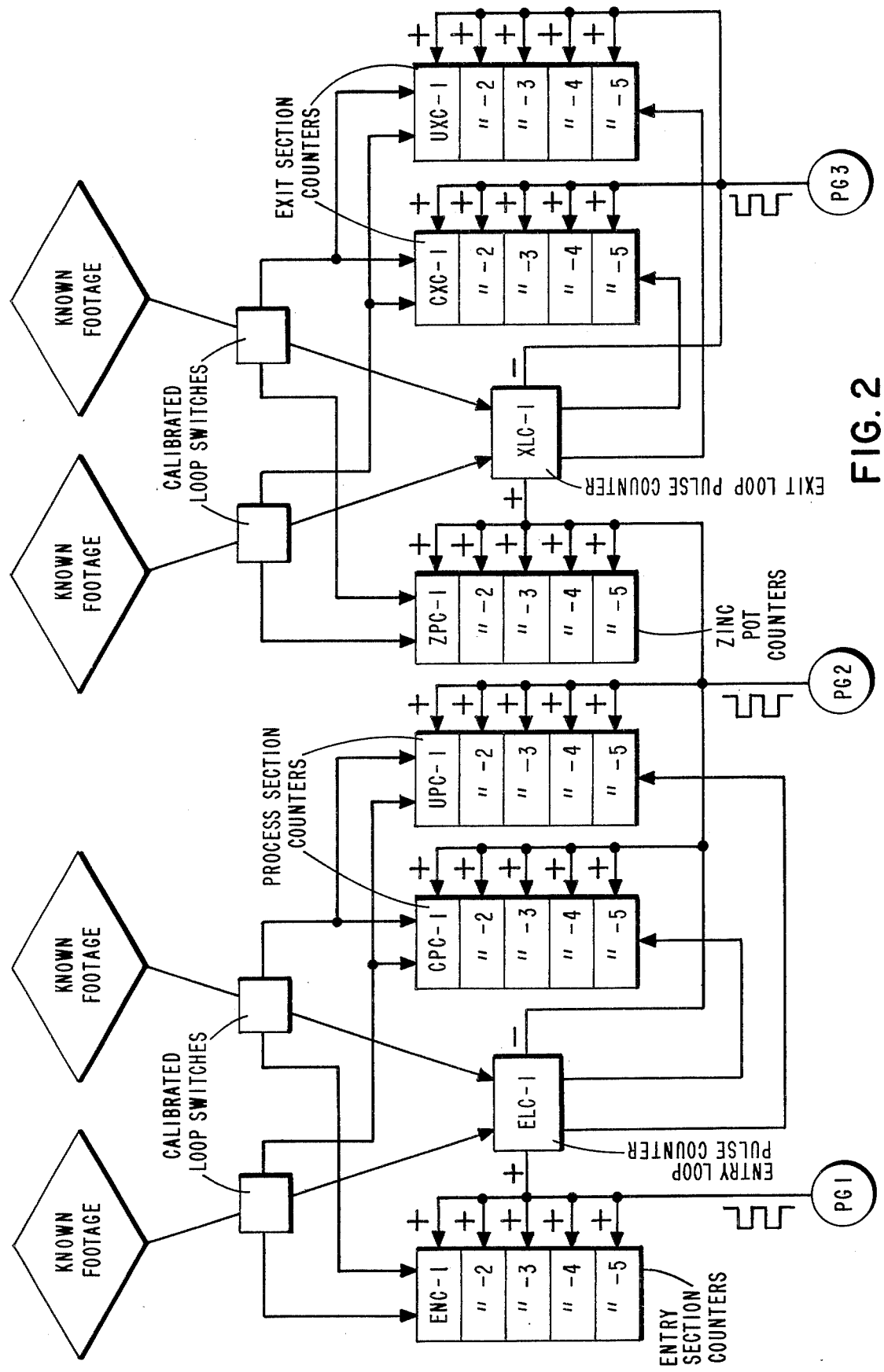
FIG. 2 shows the tracking system counters which track the strip moving through the galvanizing line.

The counter arrangement for tracking event data is shown in FIG. 2. In a galvanizing line, typical reference points are the welder in the entry section, the coating control air-knives and coating-weight measuring gauge in the process section, and the shear device in the exit section.

More than one counter may be provided for each section to permit tracking two or more discontinuities on the strip through these sections simultaneously. For example, five entry section counters, ENC1-ENC5 may be provided to permit tracking data corresponding to five separate welds or other discontinuities. Corresponding numbers of zinc pot counters and calibrated and uncalibrated process section counters CPC1-CPC5 and UPC1-UPC5, respectively, and calibrated and uncalibrated exit section counters CXC1-CXC5 and UXC1-UXC5, respectively, would also be provided.

In accordance with this invention, the contents of the entry loop counter ELC and exit loop counter XLC, FIG. 2, always reflect the total accumulation of strip in the entry loop and exit loop respectively. This accumulation is accomplished by adding tracking increments to the entry loop counter ELC in response to pulses from PG1 and subtracting tracking increments in response to pulses generated by PG2. Pulses generated by PG1 represent strip movement into the entry loop and pulses generated by PG2 represent strip movement out of the loop. Obviously, when the strip speed is constant pulse generators PG1 and PG2 generate equal numbers of pulses; thus, the contents of the entry loop counter should remain stable as long as the strip speed remains constant.

The entry loop contains calibration switches which, when activated, dump the previous contents of the entry loop counter and replace them with a preset number corresponding to a reference length of strip in the loop. Where the system includes a loop pit so that the loop hangs freely, one or more calibration switches $S_1$, $S_2$ (FIG. 1) are located in the pit at fixed points. These points are chosen so that there is a high probability that the loop will activate at least one calibration switch each time a coil is charged in the line. The length of strip in the loop required to trip the calibration switch is known; thus, each time the switch is tripped, a calibrated loop length can be entered into the entry loop counter. This is done to prevent the tracking system from accumulating small measurement errors that can occur in the tracking increment measurements added and subtracted to the entry loop counter. The calibration switches may be track-type limit switches in cases where a loop car is used and may be photoelectric switches in the case of a free hanging loop stored in a looping pit. Very often, more than one set of calibration switches is provided and the preset number entered into the entry loop counter when a calibration switch is tripped is dependent on the particular switch tripped since the switches are located at different points in the loop corresponding to different loop lengths. A similar calibration system is employed in the exit loop.

The following description illustrates the logical functioning of the event tracking system. The flow chart off FIG. 4 relates to the tracking operations initiated by the generation of weld signals. A weld signal is generated upon the completion of a weld, either automatically by the weld apparatus or manually by the operator from a push button on an operator console. In order to avoid triggering the tracking operation due to the occurrence of spurious signals, the tracking system logic is first instructed to determine whether the latest weld signal has been generated too soon after the occurrence of the previous weld signal. A reference set point, representing a distance or time which would be expected between weld occurrences, is stored in the logic for reference purposes. Thus, for example, if the coils of strip material are nominally on the order of 6,000 feet long and the strip runs at a rate of about 600 feet per minute, the logic would be instructed to ignore weld signals occurring less than say 3,000 feet apart or less than 5 minutes apart.

Once it is determined that the weld signal is a proper signal and not a spurious signal the logic is instructed to search for an available entry section counter ENC1-ENC5 (FIG. 2). A counter index is set to 1 and the number 1 counter (ENC1) is searched to ascertain whether it is in use, that is if it already contains tracking information; if so, the counter index is incremented by 1 and the second counter (ENC2) is similarly searched. This operation continues until an available counter, i.e., one containing no tracking information, is located. If all counters are found to contain information, the operation is terminated; this termination feature is in essence a fault check since in normal operation at least one entry counter would be available for storing new tracking information. Once an empty available counter has been located, it is set to zero and then incremented by pulses from pulse generator PG1 to track the weld as it moves through the entry section, the entry loop section and the process section.

At the same time that the entry counter is initiated, an available uncalibrated process section counter UPC is also initiated. This uncalibrated process section counter is initially set at a negative number whose magnitude represents the distance from the welder to a specific reference point in the process section. The magnitude of this number represents the sum of the fixed distances from the welder to the entry loop and from the entry loop to the reference point plus a variable number which represents the amount of strip in the entry loop, determined from the contents of the entry loop counter. The uncalibrated process section counter is incremented upward toward zero by pulses from pulse generator PG2. When the uncalibrated process counter contents reaches zero, this indicates that the weld being tracked has reached the process section reference point.

FIG. 5 is a flow chart of the logical operations performed to increment the entry section counter ENC and entry loop counter ELC by means of entry pulses generated by pulse generator PG1. The pulse generator used in this system generates more pulses than are necessary to follow a particular point, such as the weld point, on a strip for the accuracy required by this invention. For example, the pulse generator rate may be one pulse per foot of strip movement. The tracking increment, however, may be on the order of 10 feet; that is a given point on the strip may be tracked for each 10 feet of movement. Entry pulses from PG1 are therefore applied to the input of an increment counter IC1, which is essentially a frequency divider. A decision instruction is inserted to check the increment counter output; if this output is less than the chosen tracking increment, the operation is terminated. If the increment counter output is greater than the chosen tracking increment, the chosen tracking increment is subtracted from the increment counter and the entry section counter is incremented; at the same time, the entry loop counter is incremented. This frequency dividing system is not essential to the operation of this invention and the entry pulses could be applied directly to the entry section counters and entry loop counter.

Figure 6:
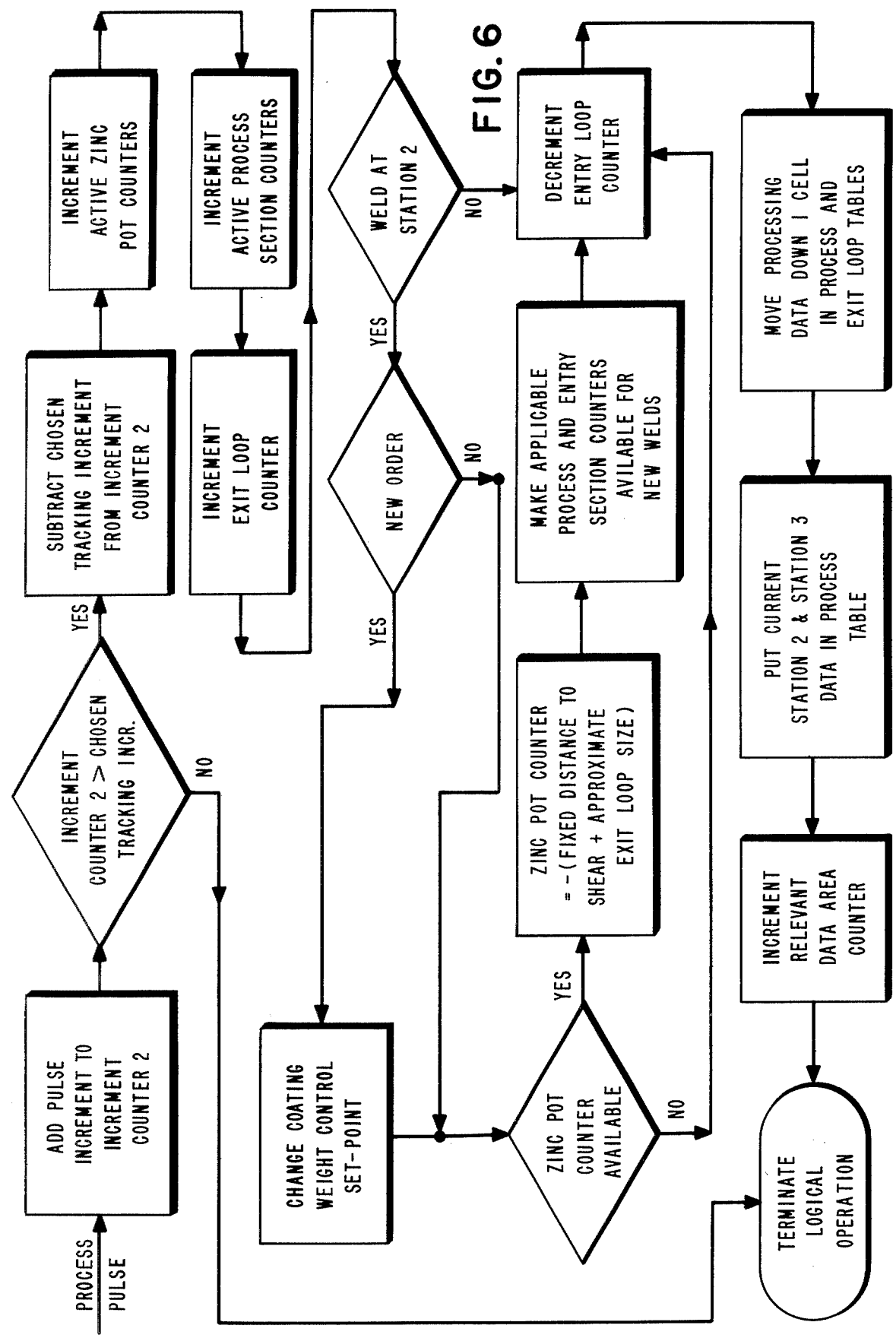
FIG. 6 shows a flow chart of the logic operations performed upon receipt of each process section pulse.

FIG. 6 is a flow chart of the logical operations performed to increment the process section counters, the zinc pot counters and the exit loop counter and to decrement the entry loop counter by means of pulses generated by pulse generator PG2. The increment counter IC2 serves as a frequency divider, similar to increment counter IC1 in FIG. 5. Pulses from PG2 are applied to increment counter IC2. The tracking system logic examines the contents of increment counter IC2 after each PG2 pulse and if these are less than the chosen tracking increment no further action is taken. When the contents of increment counter IC2 exceeds the chosen tracking increment, for example, counter IC2 contains 11 pulses and the chosen tracking increment is 10 pulses, the chosen tracking increment will be subtracted from the contents of increment counter IC2 and all active process section counters, calibrated and uncalibrated, will be incremented. The difference between calibrated and uncalibrated counters will be seen later. At the same time, the exit loop counter is incremented to indicate that strip has entered the exit loop in an amount equal to the length of the strip entering or traveling through the process section. Additionally, each active zinc pot counter is incremented.

Next, the contents of the active process section counters, calibrated and uncalibrated, are examined; if the contents are not zero, indicating that the weld being tracked by each counter has not yet reached the process section reference point, the zinc pot, for example, no action is taken at the reference point. If, however, an examination of any process counter shows the contents to be zero, indicating that the corresponding weld is at the process section reference point, such as a zinc pot, appropriate action, such as changing the coating weight control set points to adjust the weight and/or distribution of the coating on the strip is taken. Naturally if the order requirements have not been changed, the computer will be instructed to make no change in the control set points.

An obvious advantage of this system is that it permits the operator to enter new order specifications while the process is under the control of previous order requirements; the new specifications will not be made controlling until the portion of the strip to which they relate has reached the process section as indicated by the applicable (calibrated or uncalibrated) process section weld counter.

Also, after the contents of a process section counter reaches zero, the digital logic locates an available zinc pot counter, assigns it the responsibility for further tracking of the applicable weld (or other event) and forces its contents to zero. The logic also locates an available uncalibrated exit section counter and forces its contents to be equal to the negative sum of the fixed distances from the zinc pot to the exit loop and from the exit loop to the shear (or some other appropriate reference point) and the current contents of the exit loop counter. At the same time, the applicable process section counter and entry section counter are made available for tracking new welds.

Each decision ultimately includes an instruction to decrement the entry loop counter to indicate that a length of strip equal to the portion traveling through the process section has been taken out of the entry loop.

The instructions at the bottom of the FIG. 6 flow chart relating to movement of processing data through the system will be described later.

Figure 7:
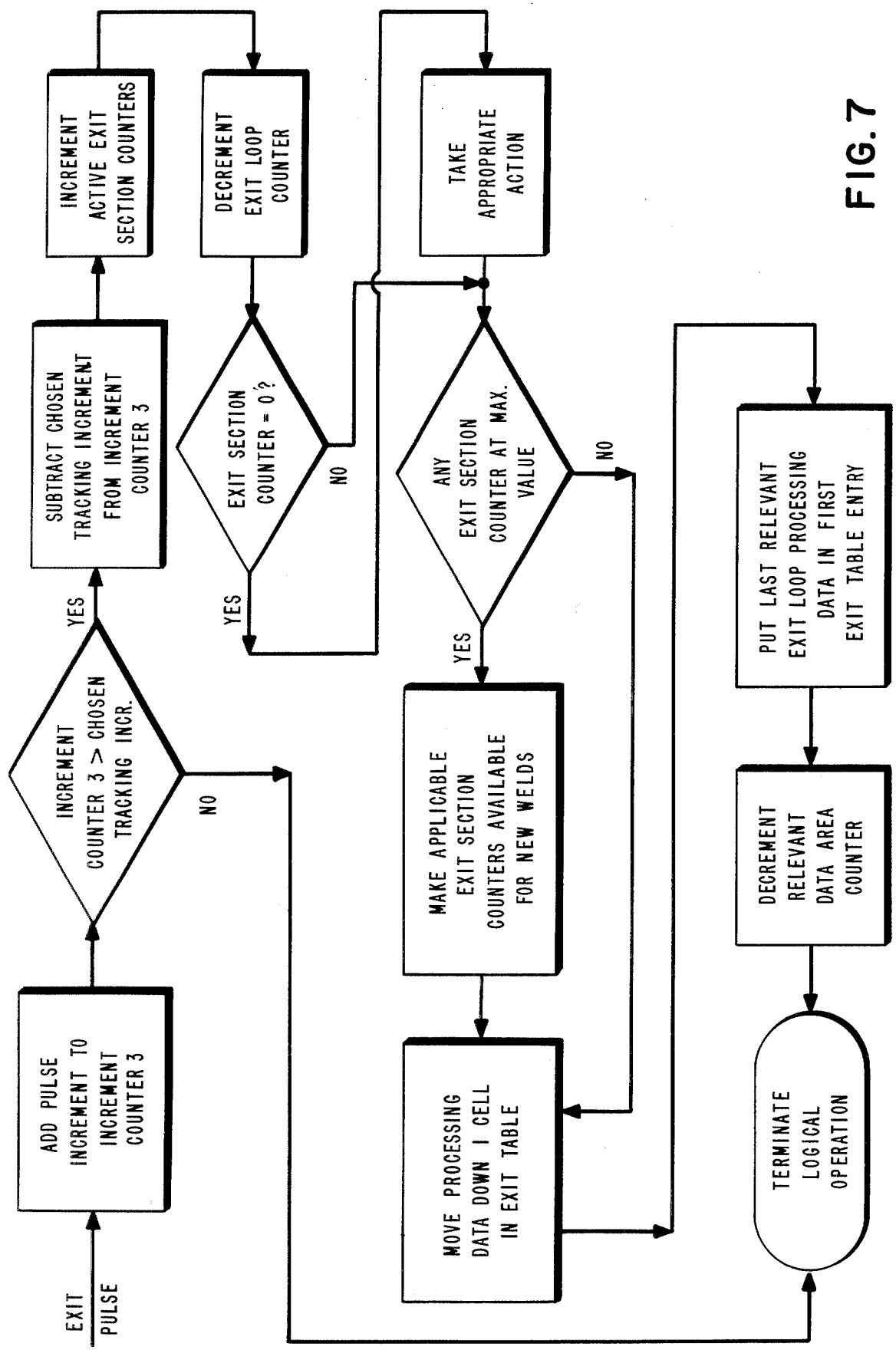
FIG. 7 shows a flow chart of the logic operations performed upon receipt of each exit section pulse.

Continuing with the movement of the event tracking signals, FIG. 7 is a flow chart showing the digital logic instructions relative to tracking through the exit section. Exit pulses generated by PG3 are added to a pulse increment counter IC3 which counts exit pulses similar to the counting of process pulses in process section increment counter IC2. When the contents of counter IC3 exceeds the chosen tracking increment, as discussed above, the chosen increment is subtracted from the contents of counter IC3 and all active exit section counters are incremented and the exit loop counter is decremented. The exit section counters (calibrated and uncalibrated) are initially set at a negative value and are incremented upward upon the occurrence of each pulse from the exit section pulse generator PG3; the contents of each exit section counter are examined and if the contents are not zero, no further action is taken. If the contents are zero, indicating that the corresponding weld is at the shear, any appropriate action, such as cutting the strip, is taken. The exit section counter is then continued to be incremented to a maximum value indicating the distance the weld has gone past the shear and, for example, into the coil. When an exit section counter has been incremented to its maximum value, it is then made available for tracking a new weld.

The remaining instructions shown in FIG. 7 relate to the movement of the processing data and will be described later.

Figure 8A:
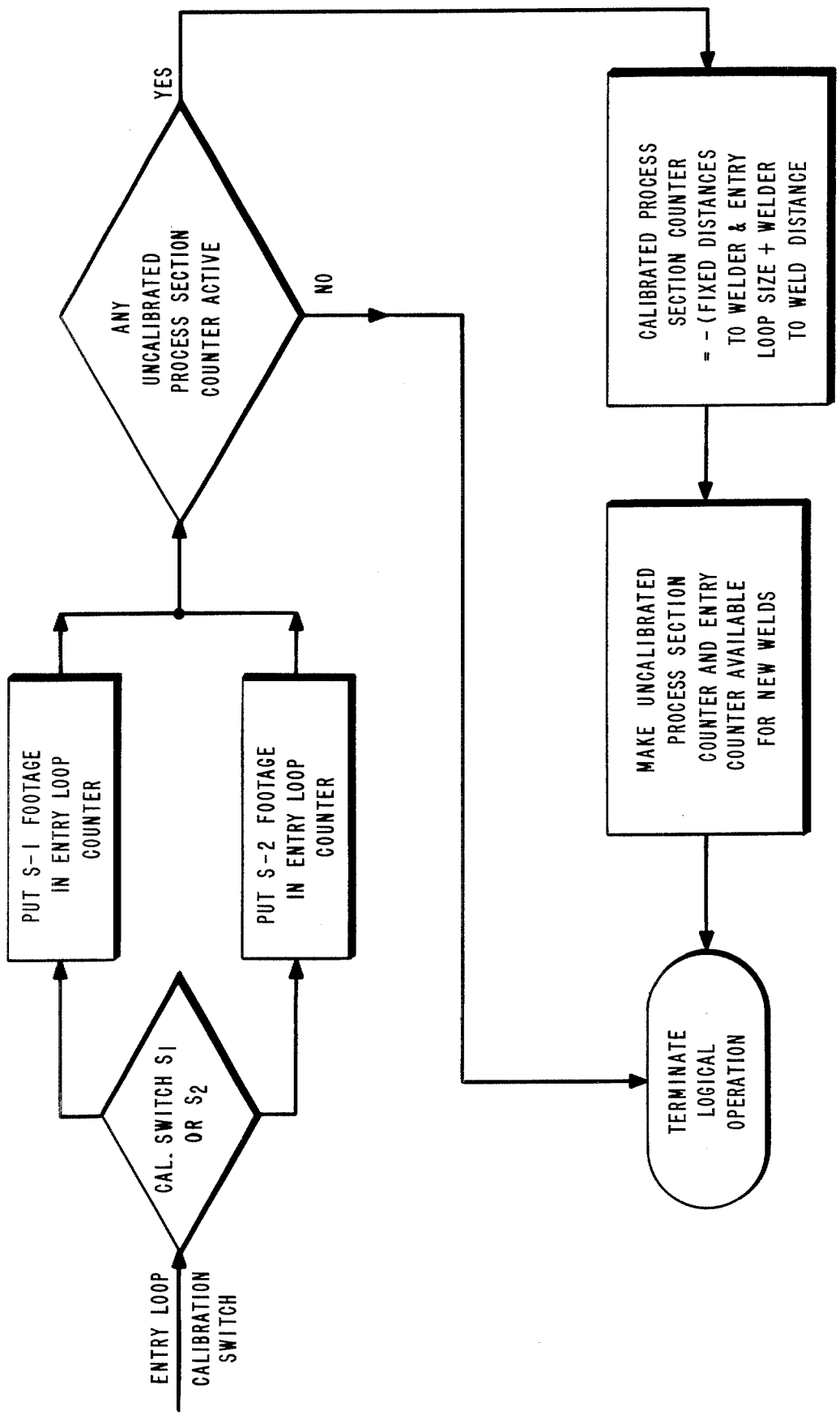
FIGS. 8a and 8b show flow charts of the logic operations performed upon receipt of calibrating signals from the entry and exit loops, respectively.
Figure 8B:
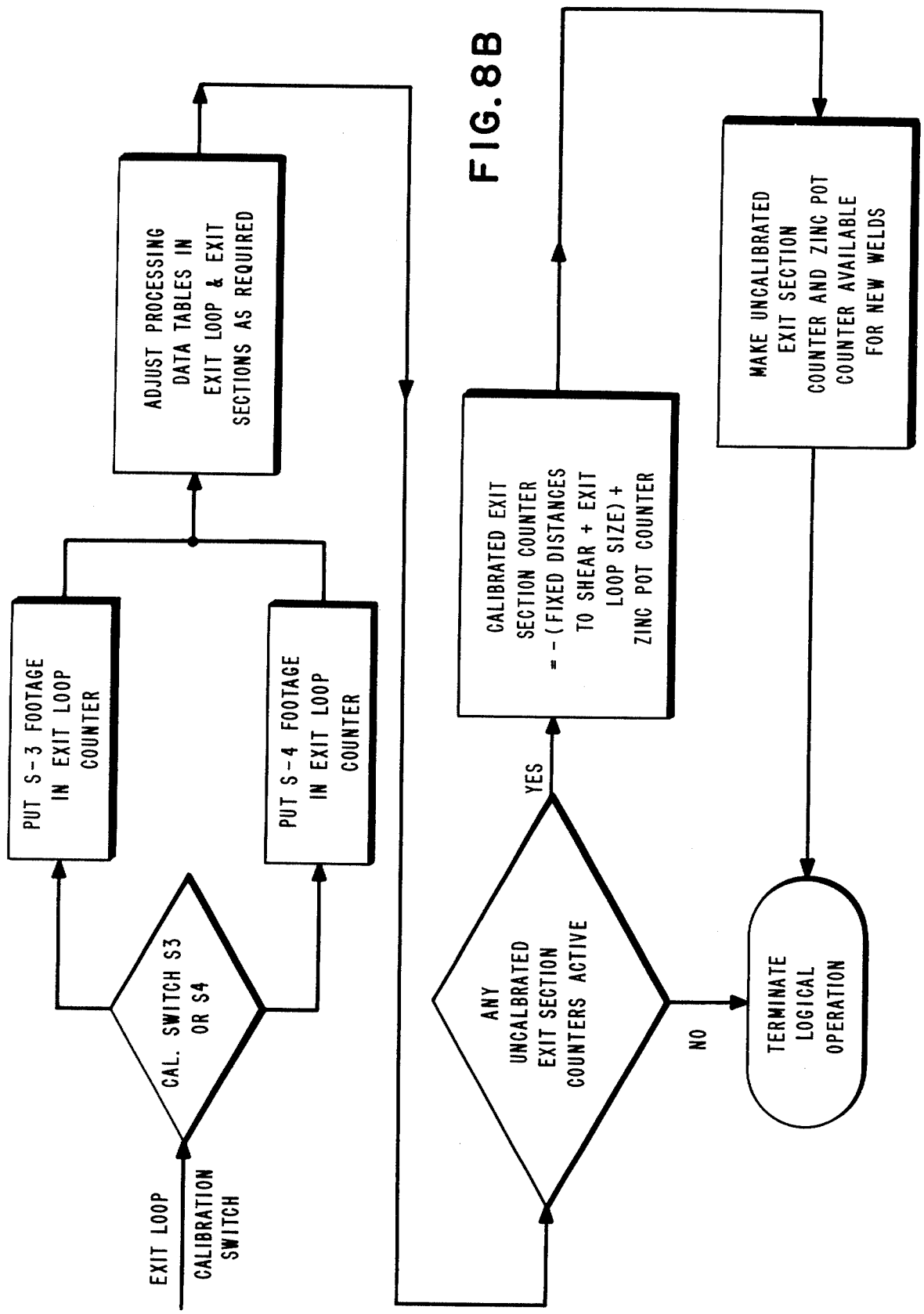

Flow charts showing both the entry and exit loop calibration techniques are shown in FIGS. 8a and 8b. Referring to FIG. 8a, when an entry loop calibration switch $S_1$ or $S_2$ is tripped, the digital logic determines which switch has been tripped and enters the corresponding reference footage into the entry loop counter and also determines whether any uncalibrated process section counters are active; if no uncalibrated process section counters are found to be active, the operation is terminated. If, on the other hand, an uncalibrated process section counter UPC is determined to be active, a corresponding calibrated process section counter CPC is activated. The calibrated process section counter is activated by adding the distance the entry end of the strip has gone since the weld occurred (contents of the applicable entry section counter) to the negative of the distance from the entry welder to the process section reference point. This latter distance is known exactly at this time since the strip footage in the entry loop is exactly known. Upon activation of the calibrated process section counter CPC, the uncalibrated process section counter UPC and the entry section counter ENC are cleared and made available for tracking new welds.

The exit loop calibration is similar to the entry loop calibration. Referring to FIG. 8b, when an exit loop calibration switch $S_3$, $S_4$ is tripped, the digital logic determines which switch has been tripped and enters the corresponding reference footage into the exit loop counter XLC and also determines whether any uncalibrated exit section counters UXC are active; if no uncalibrated exit section counters are found to be active, the operation is terminated. If, on the other hand, an uncalibrated exit section counter is determined to be active, a corresponding calibrated exit section counter CXC is activated. The calibrated exit section counter is activated by adding the contents of the applicable zinc pot counter ZPC to the negative of the distance from the zinc pot to the exit section reference point (the shear, for example). This distance is exactly known at this time since the strip footage in the exit loop is exactly known. Upon activation of the calibrated exit section counter CXC, the uncalibrated exit section counter UXC and the zinc pot counter ZPC are cleared and made available for tracking new welds.

PROCESSING DATA TRACKING

Figure 3:
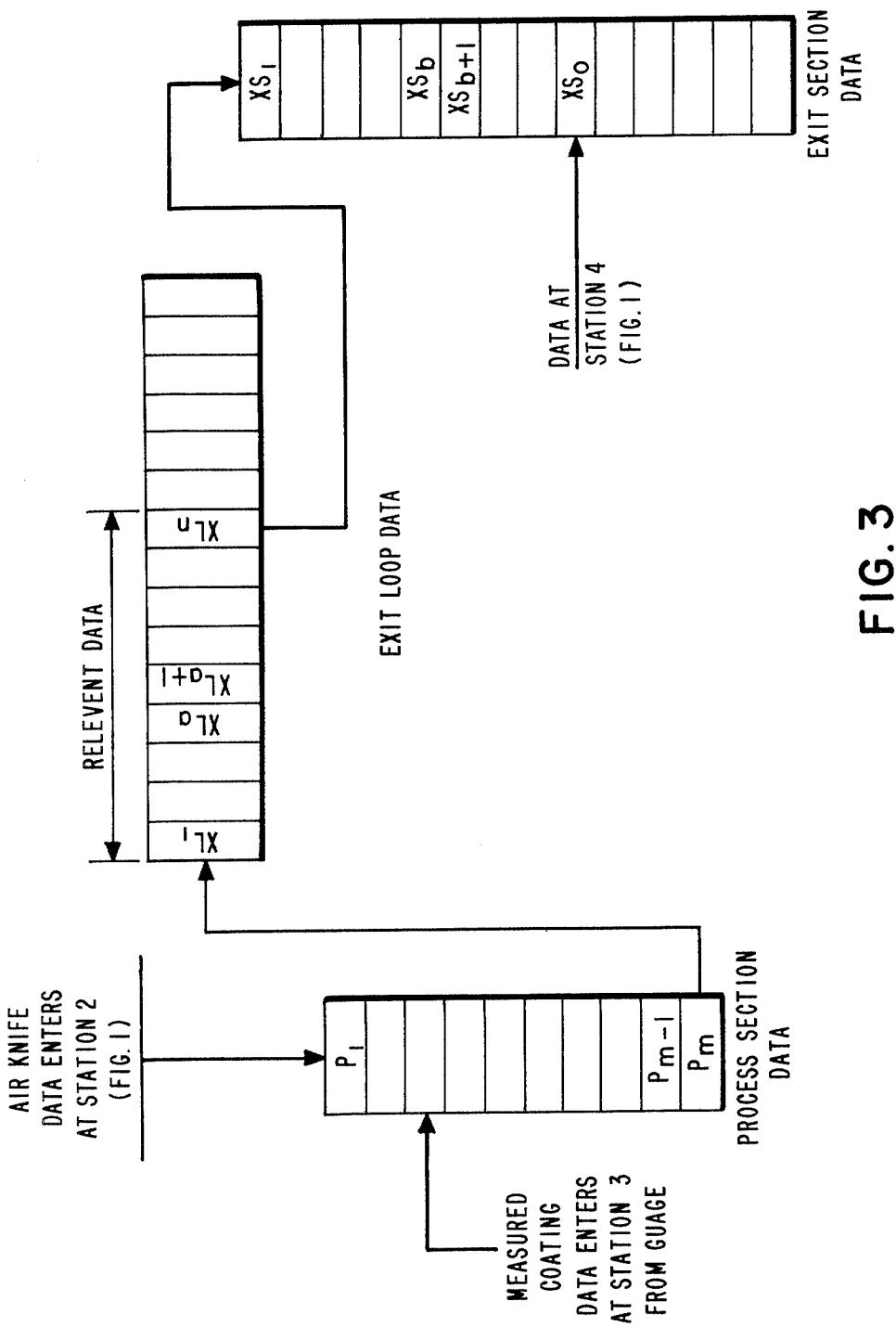
FIG. 3 shows the process data storage devices which track processing data relating to a particular area of strip through the line.

Processing data, such as coating information, are tracked in a bank of memory devices (cells). Each memory device in the bank corresponds to a fixed position in the processing line and the data are moved from memory device to memory device exactly as the strip moves through the line. FIG. 3 illustrates the arrangement of memory devices for tracking processing data in the process and exit sections and the exit loop of a continuous-galvanizing-line, and the following discussion describes how this tracking is accomplished. The concept that is described could readily be extended to handle data tracking throughout the entire length of the line including the entry section and the entry loop. Three tables are necessary to contain the data. These consist of a table of memory devices corresponding in number to the distance from the zinc pot (Station 2) to the end of the process section, a table of cells corresponding in number to the maximum exit loop distance, and a table of cells corresponding in number to the distance from the exit loop to a point that would be a distance equivalent to about 50 tracking increments beyond the exit shear (Station 4). The number of cells in each table is determined by dividing the length of the corresponding segment of the line by the basic tracking increment.

The operation of the process data tracking system in response to process section and exit section pulse generator pulses is shown in FIGS. 6 and 7 respectively.

Upon the occurrence of each tracking increment as indicated by the process-section pulse generator PG2, the following operations are performed: (1) The data are moved one cell down in the exit-loop table, i.e., the data in memory device $XL_{a+1}$ are replaced by the data from memory device $XL_a$ (2) The data from the last memory device $P_m$ in the process section data table are moved to the first exit loop data cell $XL_1$. (3) The data are moved one cell down in the process-section data table, similar to the exit-loop data table. (4) The current data (air pressure correction, coating weight set point, etc.) at Station 2 are put in the first process-section cell $P_1$. (5) The current data at Station 3 (coating weight) are added to the contents of that memory device in the process-section data table that corresponds to the location of Station 3 in the line. (6) The contents of an exit loop relevant data counter are increased by 1 (FIG. 6). Thus, the contents of this counter always reflect the number of cells containing relevant data in the exit-loop data table.

Upon the occurrence of each tracking increment as indicated by the exit-section pulse generator PG3: (1) The data are moved one cell down in the exit-section data table, i.e., the data in cell XS b+1 are replaced by the data in cell $XS_6$. The data in that cell ($XS_0$) corresponding to the location of Station 4 are recorded in some appropriate manner for purposes of production reporting. (2) The data from the last relevant data cell $XL_7$ in the exit loop relevant data area are put in the first entry $XS_1$ of fthe exit section data table. (3) The exit-loop relevant data area is decreased by 1 (FIG. 7).

The last group of instructions on each of the flow charts of FIGS. 6 and 7 relate the operations of the process and exitsection pulse generators to the movement of processing data stored in the data tables of FIG. 3 as described above. Referring first to FIG. 6, the process-section pulses from PG2 which increment the process section counters, exit loop counter, and zinc pot counters and which decrement the entry-loop counter are also applied to move the data stored in the process-section and exit-loop tables in a forward direction toward the exit-section data table. More specifically, for each tracking increment of strip movement, the process-section data is moved forward (downward in FIG. 3) by one cell and the current processing data (representing air-knife) pressure correction and coating weight set point data and measured coating weight and distribution data) are entered into the appropriate memory cells (Station 2 and Station 3) in the process-station data table. The oldest data (bottom-most cells in FIG. 3) is transferred from the process-section data table into the relevant data area of the exit-loop data table as described above, thus following the corresponding portion of the strip into and through the exit loop. In FIG. 7, it will be noted that transfer of data from the exit-loop table to the exit-section table is made from an intermediate cell in the former. The exit-loop data table cell $XL_n$ from which data is transferred to the exit-section table corresponds to the count position of the exit loop relevant data area counter. As noted earlier, the exit loop relevant data area counter is incremented on the occurrence of each process section tracking increment (FIG. 6) and decremented upon the occurrence of each exit section tracking increment.

Whenever the exit loop passes one of the exit-loop calibration switches, the relevant data area is adjusted if necessary to compensate for small measurement errors that could occur in determining the exact strip travel represented by each pulse from the process section and exit section pulse generators.

This adjustment of the relevant data area is accomplished as follows:

1. If the known length of strip in the exit loop at the instant when the exit loop passes a calibration switch corresponds to N tracking increments and the current contents of the exit-loop relevant-data area counter is R.

2. If $N>R$, the contents of the first (N-R) cells in the exit section data table are moved backwards (upwards in FIG. 3) to the exit-section end of the current relevant-data area in the exit-loop data table and all remaining data in the exit-section data table are then shifted backwards by (N-R) cells. The contents of the exit-loop relevant-data area counter are then set equal to N.

3. If $N-R$, all data in the exit-section data table are shifted forward (downward in FIG. 3) by (R-N) cells and the contents of the last (R-N) cells in the exit-loop relevant-data area are shifted into the first (R-N) cells of the exit-section data table. The contents of the exit-loop relevant-data area counter are then set equal to N.

4. If N = R, no further action is required.

The concept of data tracking both for event data and processing data, can be extended to locations other than the four specific stations considered thus far. Since the location of each weld in the line is always known relative to either the zinc pot (process section counter or zinc-pot counter) or shear (exit-section counter), the location of that weld relative to some other point in the line can be readily determined by examination of the contents of the appropriate process-section counter, zinc pot counter, or exit-section counter. For instance, if the zinc gauge is 20 tracking increments past the zinc pot and the current contents of the zinc pot counter corresponding to a particular weld is 10, then that weld is (20 − 10) = 10 increments from the gauge. If the weld under consideration has not yet reached the zinc pot and the corresponding process section counter contains a − 10, then that weld is (10 + 20) = 30 increments from the gauge.

Also, since each cell of the data-tracking tables, FIG. 3, has exact correspondence with a particular segment along the length of the line, data associated with the strip located at a particular position in the line can be readily determind, when desired, by examination of the contents of the cell corresponding to that particular segment of the line. For instance, if for purposes of feedback control it is desirable to know the air-knife pressure that existed when the zinc coating was applied that is currently being measured at the gauge, instantaneous values of air pressure can be entered into the tracking table at the cell corresponding to Station 2 and examined at the cell corresponding to Station 3. Likewise, zinc-coating data associated with the strip that is currently located at some point in the line, like the shear, can be determined by examination of the data table cell corresponding to that point. Similarly, zinc-coating data associated with finished product in coils or sheets can be assessed by examination of the data in these cells of the exit section data table corresponding points beyond the shear location.

It is to be understood that various modifications to the details of the preferred embodiment described herein may be made within the scope of this invention and without departing from the spirit thereof. It is intended that the scope of this invention shall be limited solely by the hereafter appended claims.

We claim,

1. In a continuous strip processing line which includes means for variable strip storage, a method for tracking the accumulation of strip in said storage means comprising: incrementing a counter in response to signals representative of
   incremental strip movements into the storage means; decrementing said counter in response to signals representative
   of incremental strip movement out of said storage means; forcing the content of said counter to a predetermined reference
   length in response in intermittent signals indicative of the existence of a known accumulation of strip in the storage means.

2. The method according to claim 1, further comprising:
   storing processing data for a predetermined location on the strip in data storage means; and
   incrementing the stored processing data through said data storage means in response to the incrementing of said counter.

3. A method for tracking a predetermined reference point on a strip material traveling through a process line, comprising the steps of:
   generating a first pulse signal corresponding to a predetermined
   increment of strip movement through an entry section of said process line;
   incrementing a first, entry section, counter with said entry section strip movement increment pulse;
   incrementing a second, entry loop, counter with said entry section strip movement increment pulse;
   generating a second pulse signal corresponding to a predetermined increment of strip movement through a process section of said process line;
   incrementing third, process sections, counter with said process section strip movement increment pulse;
   incrementing a fourth, exit loop, counter with said process section strip movement increment pulse;
   decrementing said entry loop counter with said process section strip movement increment pulse;
   adding the data stored in said entry loop counter to the data stored in said third process section counter;
   replacing the contents of said entry loop counter with a reference value corresponding to a first predetermined strip length when said strip in said entry loop reaches said first predetermined strip length;
   adding the reference value data stored in said entry loop counter to said fourth process section counter;
   storing a reference value in fifth and sixth, exit section, counters when the contents of one of said third and fourth counters reaches a predetermined set point value;
   incrementing said exit section counters with a third pulse signal corresponding to a predetermined increment of strip movement through an exit section of said process line;
   decrementing said exit loop counter with said exit section strip movement increment pulse;
   adding the data stored in said exit loop counter to said fifth exit section counter;
   replacing the contents of said exit loop counter with a reference value corresponding to a second predetermned strip length when said strip in said exit loop reaches said second predetermined strip length; and
   adding the reference value data stored in said exit loop counter to said sixth exit section counter.

4. The method according to claim 3, further comprising the steps of:
   storing process data corresponding to said strip reference point in storage means comprising a plurality of storage cells; and
   shifting said stored process data through said storage cells by said second and third process signals in increments corresponding to measured tracked increments of strip movement and in a direction corresponding to the direction of strip movement.

5. Apparatus for tracking a predetermined reference point on a strip material traveling through an entry section, an entry loop, a process section, an exit loop, and an exit section of a process line, comprising:
   first means for generating pulses corresponding to predetermined increments of strip movement through an entry section of said process line;
   an entry section counter coupled to said first pulse generating means for storing said entry section increment pulses;
   an entry loop counter coupled to said first pulse generating means for storing said entry section increment pulses, the contents of said entry loop counter being incremented by each entry section increment pulse;
   second means for generating pulses corresponding to predetermined increments of strip movement through said process section of said process line;
   first and second process section counter coupled to said second pulse generating means for storing said process section increment pulses, said second pulse generating means being coupled to said entry loop counter, the contents of said entry loop counter being decremented by each process section increment pulse;
   calibrating means coupled to said entry loop counter for replacing the contents of said entry loop counter with a calibrated count representing a known strip length;
   means coupled to said calibrating means for triggering said calibrating means to replace said entry loop counter contents with said calibrated count when a known length of strip is in said entry loop;
   means coupling said entry loop counter to said first process section counter to add the contents of said entry loop counter to the contents of said first process section counter;
   means coupling said entry loop counter to said process section counter to add said calibrated count in said entry loop counter to the contents of said second process section counter;
   an exit loop counter coupled to said second pulse generating means for storing said process section increment pulses, the contents of said exit loop counter being incremented by each process section increment pulse;

third means for generating pulses corresponding to predetermined increments of strip movement through said exit section of said process line;

first and second exit section counters coupled to said third pulse generating means for storing said exit section increment pulses, said third pulse generating means being coupled to said exit loop counter, the contents of said exit loop counter being decremented by each exit section increment pulse;

second calibrating means coupled to said exit loop counter for replacing the contents of said exit loop counter with a second calibrated count representing a known strip length;

means coupled to said second calibrating means for triggering said second calibrating means to replace said exit loop counter content with said second calibrated when a known length of strip is in said exit loop;

means coupling said exit loop counter to said first exit section counter to add the contents of said exit loop counter to the contents of said first exit section counter; and means coupling said exit loop counter to said second exit section counter to add said section calibrated count in said exit loop counter to the contents of said second exit section counter.

6. The apparatus according to claim 5, further comprising:

storage means for storing processing data corresponding to said strip reference point, said storage means comprising a plurality of storage cells;

said second pulse generating means being coupled to said storage means for shifting processing data stored in a given storage cell to the next succeeding storage cell with each process section pulse increment, such that said processing data is shifted through said storage means at a rate and in a direction corresponding to strip movement through said process line.

7. In a continuous strip processing line which includes means for variable strip storage, a method for tracking the movement of strip through said processing line, comprising:

incrementing a storage section counter in response to first signals representing incremental strip movement in to said storage means;

decrementing said storage section counter in response to second signals representing incremental strip movement out of said storage means and into a process section;

incrementing a process section counter in response to said second signals;

forcing the contents of said storage section counter to a predetermined reference value in response to third signals representing a known accumulation of strip in said storage means; and correcting the incremental value stored in said process section counter in response to said second signals by the predetermined reference value stored in said storage section counter.

8. The method according to claim 7, further comprising:

incrementing a second storage section counter in response to said second signals which also represent incremental strip movement out of said process section and into a second storage means;

decrementing said second storage section counter in response to fourth signals representing incremental strip movement out of said second storage means and into an exit section;

incrementing an exit section counter in response to said fourth signals;

forcing the contents of said second storage section counter to a second predetermined reference value in response to fifth signals representing a known accumulation of strip in said second storage means; and correcting the incremental value stored in said exit section counter in response to said fourth signals by the predetermined reference value stored in said second storage section counter.

* * * * *